United States Patent [19]

Irie

[11] Patent Number: 4,473,427

[45] Date of Patent: Sep. 25, 1984

[54] RADIAL TIRE MANUFACTURE APPARATUS

[75] Inventor: Nobuhiko Irie, Nagasaki, Japan

[73] Assignee: Mitsubishi Jukogyo Kabushiki Kaisha, Japan

[21] Appl. No.: 384,953

[22] Filed: Jun. 4, 1982

[30] Foreign Application Priority Data

Jun. 12, 1981 [JP] Japan ................................. 56-90427
Jun. 12, 1981 [JP] Japan ................................. 56-90428
Aug. 12, 1981 [JP] Japan ................................. 56-126428

[51] Int. Cl.$^3$ ................................................ B29H 17/00
[52] U.S. Cl. ................................. 156/396; 156/406.2; 156/419; 156/111; 156/126; 156/128.1; 211/23; 211/20
[58] Field of Search ................. 156/396, 406.2, 111, 156/126–127, 128.1, 128.6, 129–130, 133–134, 123, 394.1, 417–420, 110.1; 211/23, 20, 79–80; 414/910, 744 R, 680, DIG. 3, 1 BC, 1 BD

[56] References Cited

U.S. PATENT DOCUMENTS

| | | | |
|---|---|---|---|
| 2,871,912 | 2/1959 | Kraft | 156/406.2 |
| 3,865,669 | 2/1975 | Todd | 156/406.2 |
| 4,010,059 | 3/1977 | Yabe | 156/420 |
| 4,045,277 | 8/1977 | Habert et al. | 156/419 |
| 4,105,487 | 8/1978 | Suzuki et al. | 156/132 |
| 4,190,482 | 2/1980 | Yabe | 156/126 |

FOREIGN PATENT DOCUMENTS

| | | |
|---|---|---|
| 50-2625 | 1/1975 | Japan . |
| 50-31910 | 10/1975 | Japan . |
| 51-19871 | 6/1976 | Japan . |
| 52-17063 | 5/1977 | Japan . |
| 53-11310 | 4/1978 | Japan . |
| 53-25580 | 7/1978 | Japan . |
| 55-21669 | 6/1980 | Japan . |
| 55-31734 | 8/1980 | Japan . |
| 54-124639 | 9/1980 | Japan . |
| 55-135648 | 10/1980 | Japan . |
| 55-135647 | 10/1980 | Japan . |
| 56-174235 | 10/1982 | Japan . |

Primary Examiner—Lois E. Boland
Attorney, Agent, or Firm—McGlew and Tuttle

[57] ABSTRACT

A radial tire forming apparatus wherein a first stage forming arrangement comprising a carcass band forming drum, green case forming drum and band transfer, and a second stage forming arrangement comprising a belt-tread structure forming drum, raw tire forming drum and belt-tread transfer, are so arranged that the above mentioned respective forming drums may be positioned on the same axis. A green case transfer is set above the first and second stage forming arrangements and improvements in the green case transfer and further a novel formation of a gripping device for forming the green case transfer are provided.

11 Claims, 22 Drawing Figures

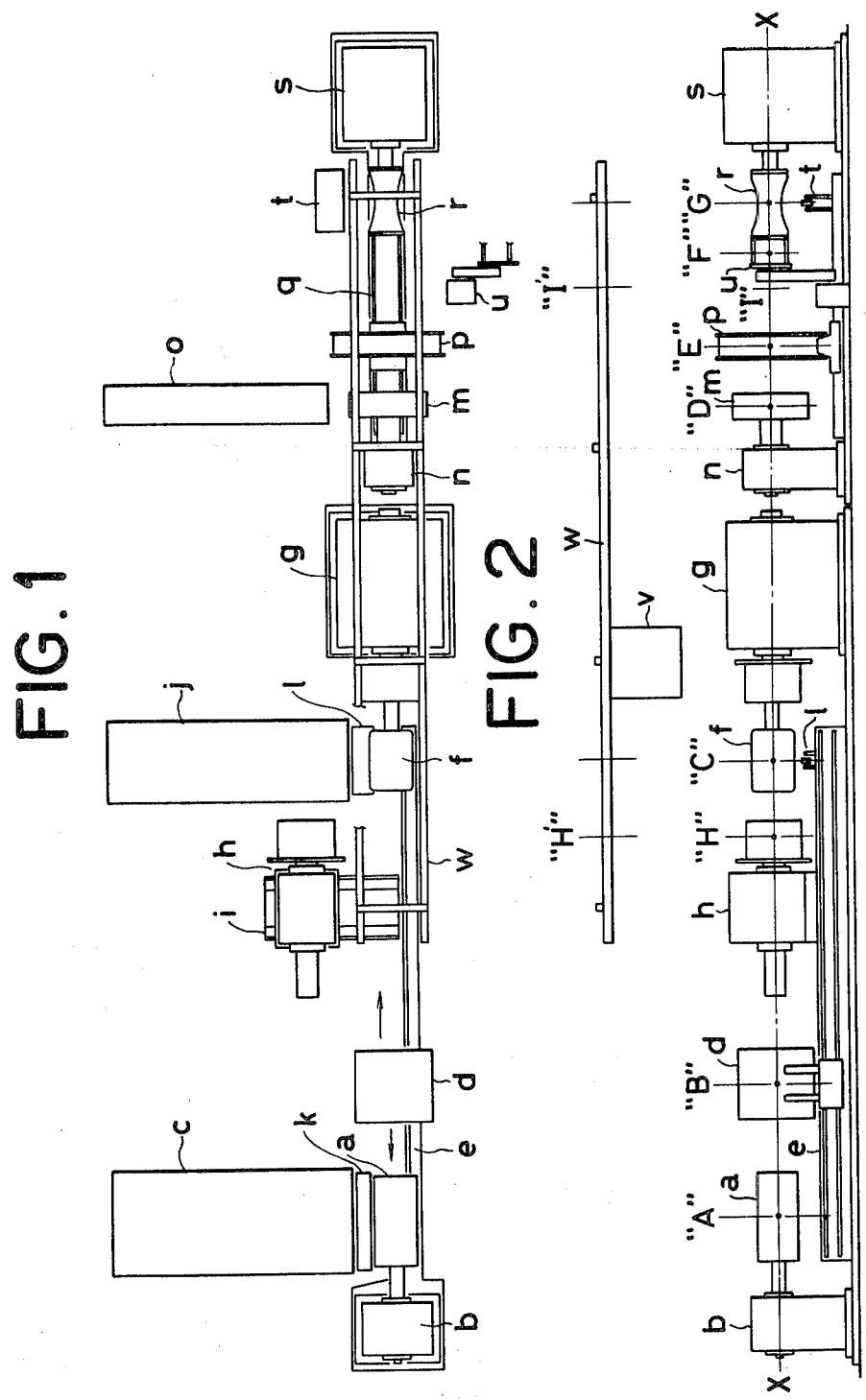

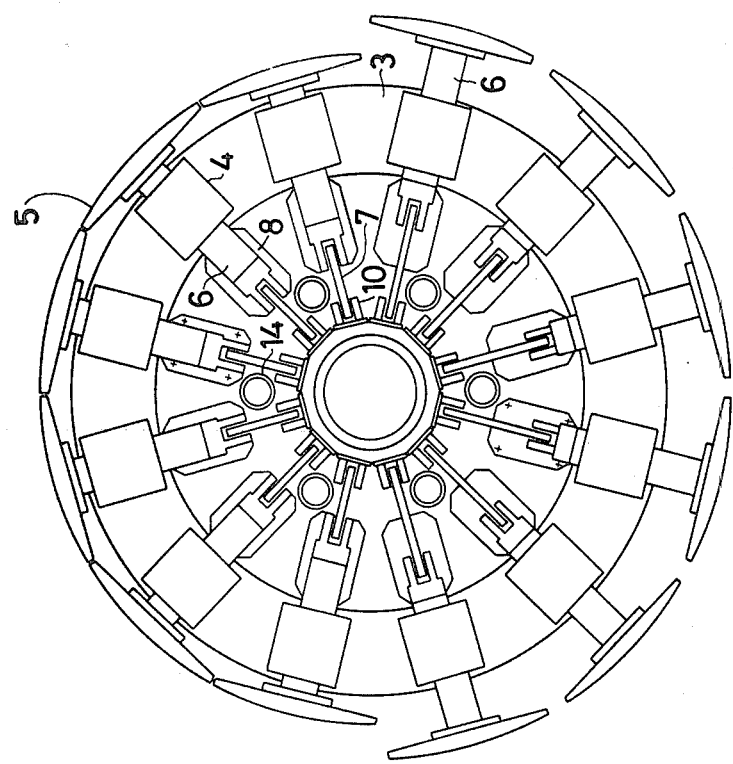
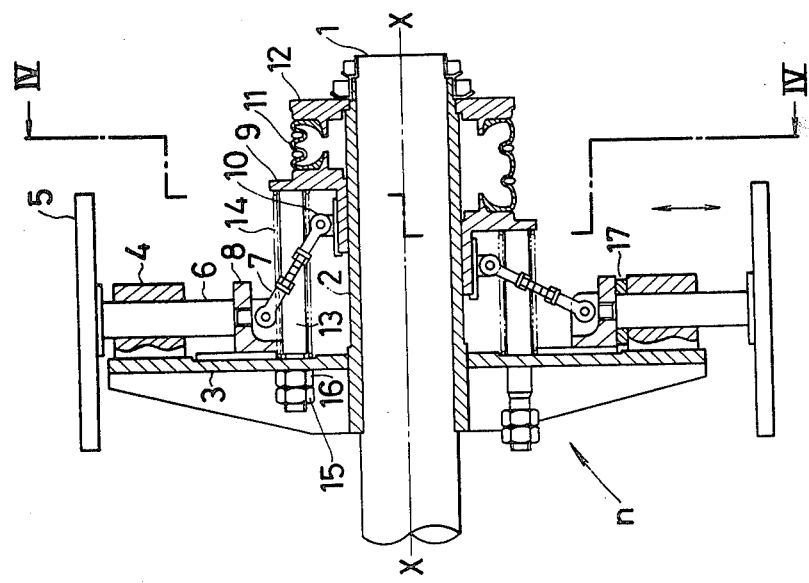

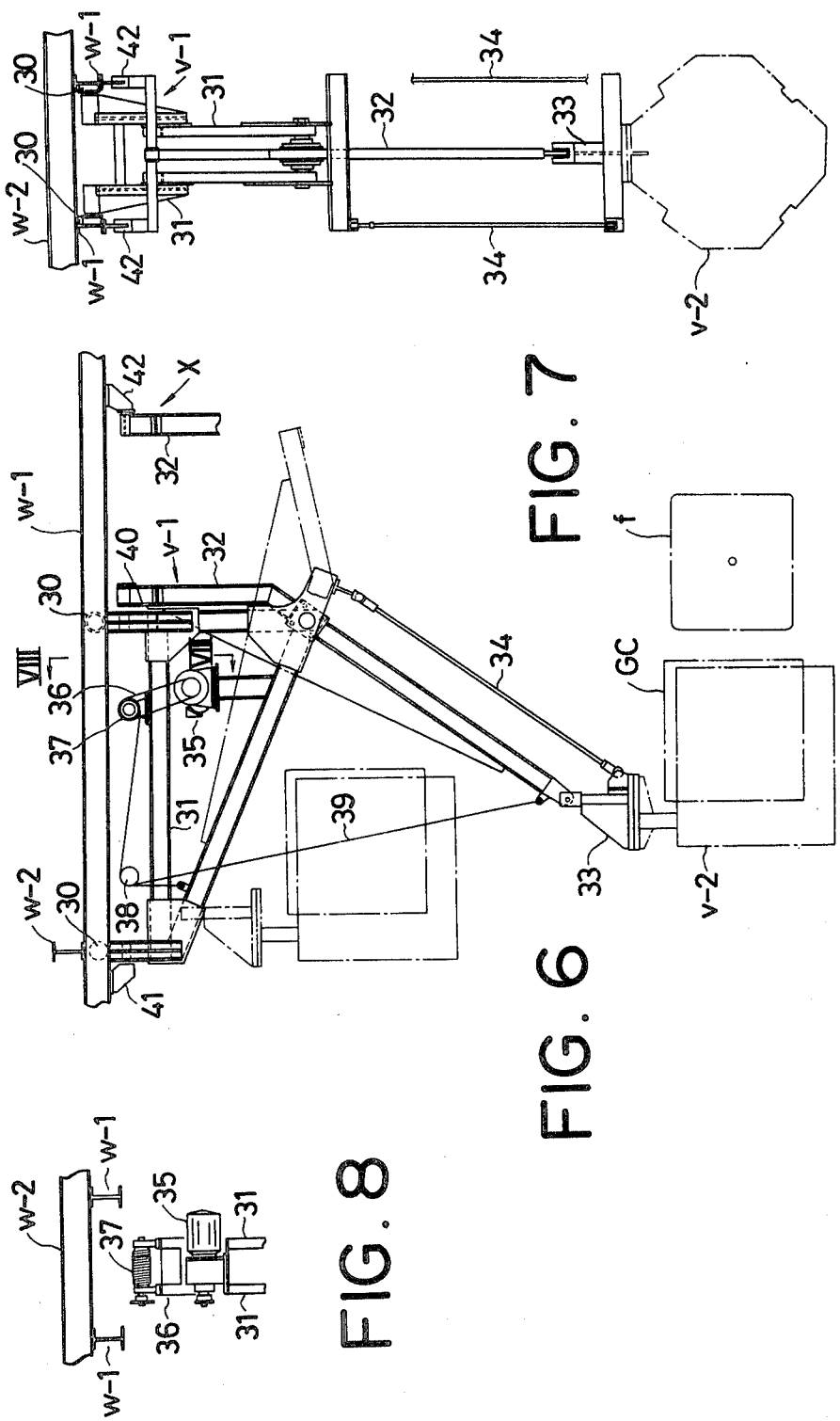

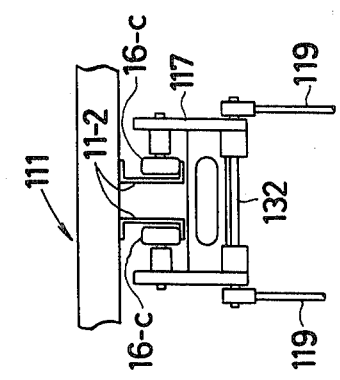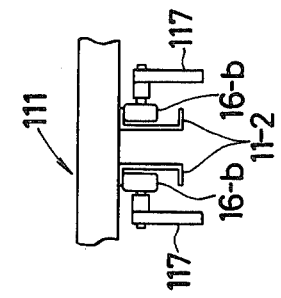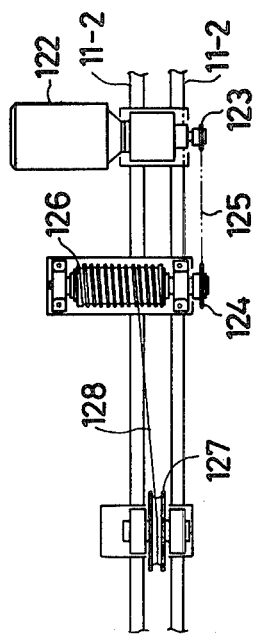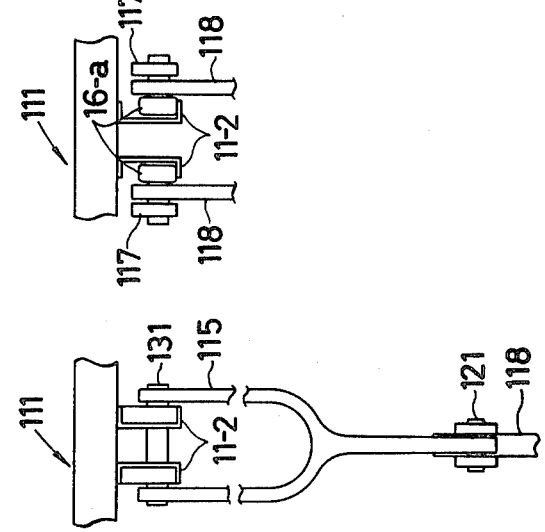

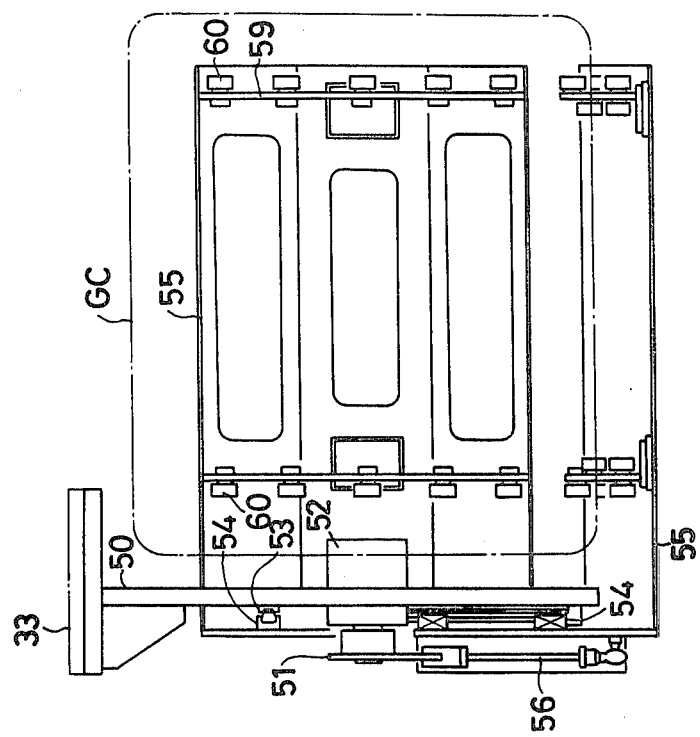
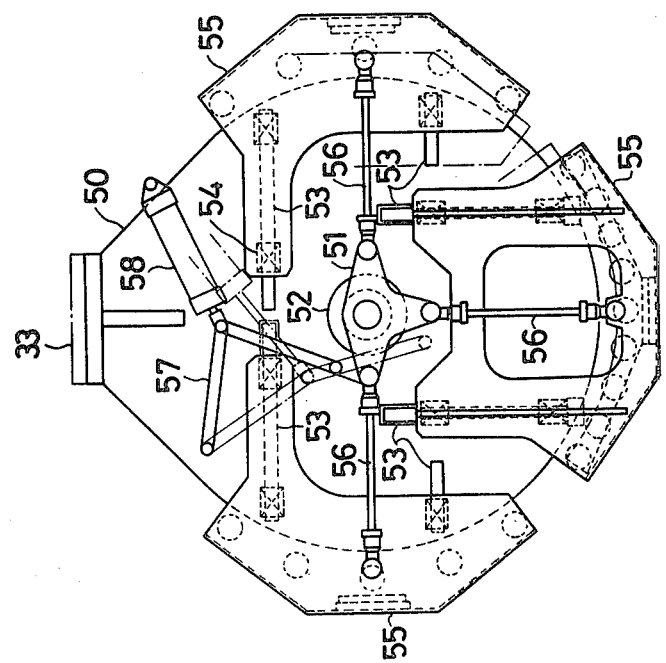

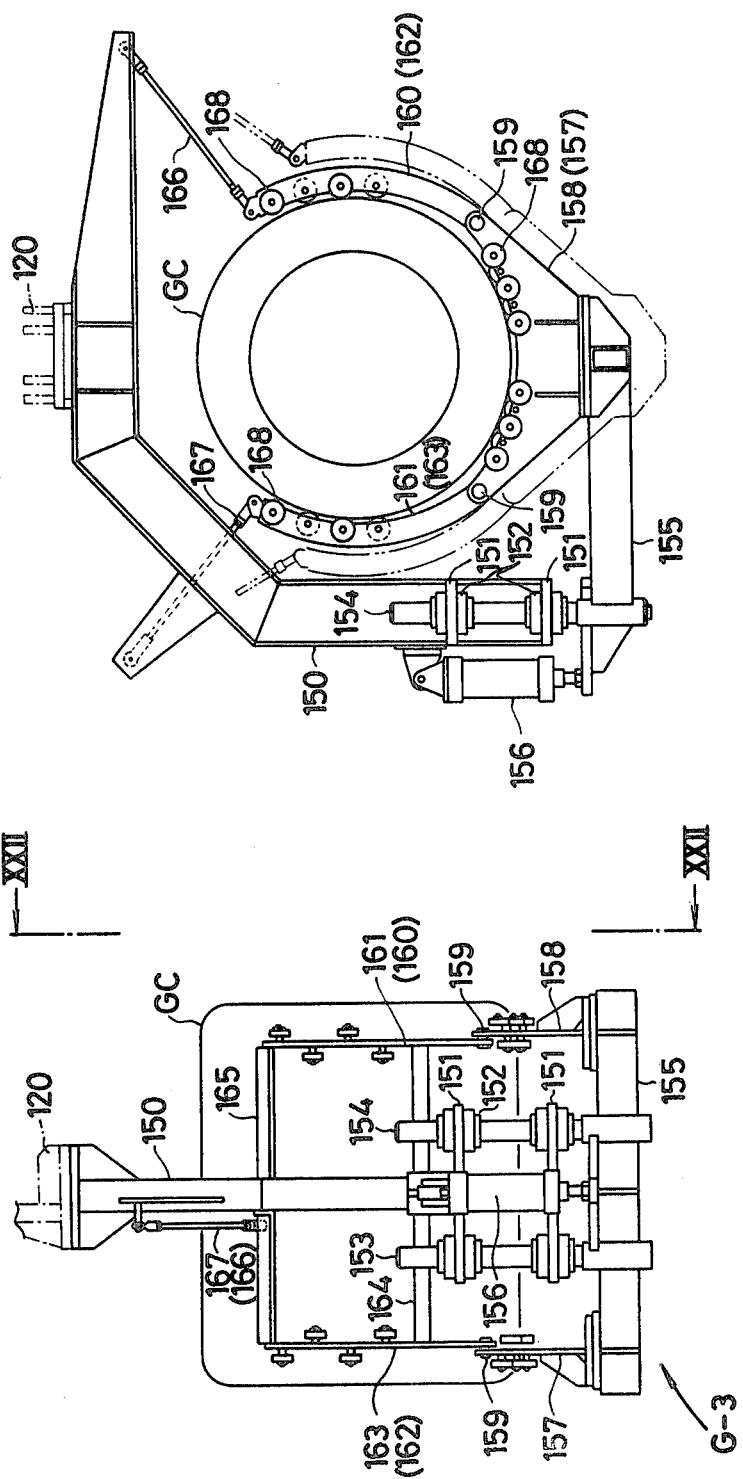

RADIAL TIRE MANUFACTURE APPARATUS

BACKGROUND OF THE INVENTION (a) Field of the Invention

This invention relates to improvements in a radial tire manufacturing apparatus. Also the present invention relates to improvements in a green case transfer in the radial tire manufacturing apparatus and gripping means for gripping the green case.

(b) Description of the Prior Art

I. A radial tire manufacturing apparatus

In order to assemble a high quality raw tire in the manufacture of radial tires, the following steps are required:

1. To assemble the raw tire with high precision as to the position of, relationship between and the peripheral lengths of a carcass ply, an inner liner and other members forming a carcass band,
2. To set and securely enclose bead cores at a high precision in the above mentioned carcass band,
3. To assemble side wall forming members of a tire precisely and securely, and
4. To combine a belt-tread structure precisely and securely with an assembled green case.

At the same time, manufacturing equipment which is high in economy and productivity is required.

Under such circumstances, some methods have already been suggested and adopted but have not satisfied all of the above requirements.

Well known typical methods include a two-stage forming method, a one-stage forming method and such a forming method is as shown in Japanese Patent Publication No. 24463/1978.

The problems of the above mentioned respective forming methods shall be described in the following:

1. Two-stage forming method.

In this method, two methods of assembling a carcass band are actually adopted.

(a) One of them is a method wherein an inner liner, carcass ply and other members forming a carcass band are wound directly on a green case forming drum so as to be assembled. In this case, there are disadvantages that, as the green case is assembled on a forming drum, the time required to produce a green case per set will become so long that, as a result, the working rate of the equipment will be reduced and, on the other hand, a precise assembly and positive bonding will be difficult over the entire range in the width direction of a carcass band. Further, there have been disadvantages that, as it is necessary to concentrate many materials in one place, the material feeding apparatus will become so complicated and large that the materials will be hard to feed.

(b) In order to solve such disadvantages, there is adopted another method wherein a carcass band is assembled in advance in an independent forming step and and is then inserted into a green case forming drum. According to this method, though the productivity will improve and will be higher than 1(a) above, there is a disadvantage that, as the assembled carcass band is removed, conveyed and inserted manually and a storing place is required in the course of the conveyance, the quality of the completed tire will suffer due to the limited day control the carcass band to hold the quality uniform and due to a deformation which occurs during storage. Further, in this case, when the above mentioned carcass band assembled is inserted in advance into the green case forming drum, the center position will be displaced. This poses an obstacle to high level quality.

(c) Whichever of the above mentioned carcass band forming methods may be adopted, the convention two-stage forming method has the following further disadvantage in the case of transfering the green case formed in the first stage to the second stage, the green case will have to be taken out of the carcass forming drum of the first stage and inserted into the forming drum of the second stage. The green case is manually taken out, conveyed and inserted. This results in an obstacle to high level productivity.

(d) Further, as there is a difference (which will be conspicuous in the case of a method wherein a carcass band is assembled on a green case forming drum) between the producing capacity of the second stage and that of the first stage. Because of this, a green case storing place will be required between the first stage and second stage. This causes a reduction in quality for the completed tire due to the limited day control and deformation during storage time.

2. One-stage forming method.

In the case of this method, at a time when radial tubeless tires, particularly for trucks and buses, were in high demand in the market, and began to be produced, the one-stage forming method was noted due to the peculiarity in the structure of the tubeless tire and was partly practiced. However, this method is inferior to the above mentioned two-stage forming method in respect to efficiently producing tubeless tires and obtaining a high level quality with an increase in production ratio of tubeless tires due to the following points:

(a) The one-stage forming method is inferior to the two-stage forming method in strongly assembling a carcass ply, inner liner and other members forming a carcass band at high precision with respect to positional relationships and peripheral lengths in the band.

(b) It is inferior to the two-stage forming method in precisely and strongly assembling tire side wall forming members.

(c) It is inferior to the two-stage forming method since the number of fibers in a carcass ply enclosing the beads will be reduced.

(d) While the one-stage method is free from the trouble of the above described limited day control, the quality reduction caused by deformation at the time of intermediate storage and the trouble in handling the green case in the two-stage forming method, the one-stage method is very low in productivity.

The one-stage forming method thus has such problems as listed above and cannot exceed the above mentioned two-stage forming method.

3. Forming method shown in Japanese Patent Publication No. 24463/1978.

The forming method which is shown in the above mentioned patent is suggested as a solution to the disadvantages of the above mentioned one-stage forming method and two-stage forming method, but has such problems as set forth in the following:

(a) In this patent, as a carcass band and green case are formed in the same place, there are the same problems as in 1(a) in the above mentioned two-stage forming method.

(b) In this patent, since a carcass ply and inner liner forming a green case are not wound and assembled on a rigid drum, a strictly precise green case cannot be provided.

(c) In this patent, two green case forming drums are used alternately to increase the productivity of the green case but, when the tire size to be produced is to be changed, it will be necessary to simultaneously replace the two drums. The equipment will thus be costly and also the time required for the replacement will be longer. Under the circumstances where productivity is measured in fractions of seconds, the replacement of one more drum will bring about the disadvantage of reduced productivity.

(d) In this patent, as a green case transfer and belt-tread structure transfer are mechanically connected with each other, the green case inserting time must be long enough so as not to obstruct the belt forming operation. Also, a carcass band completed on the carcass band forming drum will be subjected to a time restriction that the green case must be delivered to the above mentioned transfer before the carcass band is returned to a material winding position. As a result, there is the problem that the operator must exactly follow the automatically operated mechanical action.

Several years ago, the number of parts forming a tire was so high and the degree of automation in the apparatus for feeding these parts or materials was so low, that the times required for the respective steps of a carcass band forming step, green case forming step and felt-tread structure forming step were different, the equipment capacities of the respective steps were unbalanced and, therefore, tires were produced in respective independent separate equipment to elevate the equipment working rates of the respective steps. This fact had its own significance as to productivity, although there were problems due to the intermediate handling requirements and some reduction in quality.

Recently, and simultaneously with progress in the simplification of the number of parts that form a tire, the automation of the material feeding apparatus has progressed so quickly and the times required for the above mentioned respective three steps have come to be so close to one another, that the significance of making the respective steps independent and separate has become low. On the other hand, the trouble of handling and the quality reduction accompanying such handling have become considerable problems. Therefor, it is required to organically handle the intermediate products between the respective steps so as to manufacture radial tires that are high in quality and are made with high productivity. That is to say:

(1) A carcass band is assembled on an expansible substantially cylindrical rigid drum (carcass band forming drum), the band is mechanically gripped and transferred with a band transfer having an expansible outside gripping mechanism and the band is automatically inserted into an expansible cylindrical rigid drum (green case forming drum). Bead cores are set on the cylindrical rigid drum and are enclosed at the ends of the carcass band. The required side wall members are then combined to complete a green case and this green case is mechanically and automatically gripped and transferred and is mechanically and automatically set on expansible drum means for making the green case toroidal. A belt-tread structure is assembled on an expansible substantially cylindrical rigid drum (belt-tread forming drum) in parallel with the above operations and is mechanically and automatically transferred to the toroidal green case on the above mentioned drum for making the green case toroidal with a belt-tread transfer having an expansible outside gripping mechanism and is combined with it to assemble a raw tire and this raw tire is mechanically and automatically taken out with the above mentioned belt-tread transfer and is further taken out of the apparatus with tire discharging means to continuously produce radial tires.

(2) The above mentioned band transfer is made to wait in the course of transferring the band, in the course of the return and in a position not obstructing the carcass band forming operation and green case forming operation so that the deviation of the above mentioned respective independent operations from the expected time can be adjusted. The above mentioned green case transfer is made to wait in the course of transferring the green case, in the course of the return and in a position not obstructing the green case forming operation and belt-tread combining operation so that the deviation of the above mentioned respective independent operations from the expected time can be adjusted. The above mentioned belt-tread transfer is made to wait in the course of transferring the belt-tread structure, in the course of the return and in a position not obstructing the belt-tread structure forming combining operation, belt-tread operation and green case inserting operation by the green case transfer so that the deviation of the above mentioned respective independent operations from the expected time can be adjusted. In this way there is greater freedom of the operations carried out by the band forming drum, belt-tread assembling drum and belt-tread and green case combining drum from a delay beyond the expected time. Even if the respective operations are not carried out exactly at the expected time, the productivity of the entire system will not be reduced.

(3) The green case transferred from the first stage to the second stage is transferred and made to wait in the space above the first stage equipment and second stage equipment so as to effectively utilize the equipment space.

Thereby, economical equipment which is high in productivity and can manufacture tires high in quality is hoped for due to these developments.

II. A green case transfer in a radial tire manufacturing apparatus:

As mentioned above, the two-stage forming method is extensively adopted as a manufacturing method of assembling and forming a green tire of a radial tire. This is a method wherein a cylindrical green case is assembled in a first stage forming means and is transformed from the cylindrical form to a toroidal form and a belt and tread are pasted on its outer periphery to complete a green tire.

In this method, in the case of transferring the above mentioned cylindrical green case from the first stage forming means to the second stage forming means, conventionally, the following manual operations are made:

(1) Removing the assembled green case from the first stage forming means, (2) Mounting the removed green case on a conveying carriage, (3) Conveying the green case with the carriage to a green case storage between the first stage forming means and second stage forming means, (4) Mounting the required green case on the conveying carriage and conveying it from the storage to the second stage forming means, and (5) Setting the green case in the second stage forming means.

Thus, there have been defects that not only a large labor force is required but also the limited day control of the green case in storage is required and troublesome, a wide storing place is required, the green case will be stained or deformed in the course of the transfer and the production of a tire which is high in quality cannot be hoped for.

SUMMARY OF THE INVENTION

The radial tire manufacturing apparatus in the present invention is suggested in view of the above described points. Its object is to provide a radial tire manufacturing apparatus which can improve productivity and tire quality, which is economical and and which is high in operationability.

The radial tire manufacturing apparatus of the present invention is characterized in that it includes first stage forming means comprising a carcass band forming drum forming a cylindrical carcass band, a green case forming drum which is arranged on the same axis as the carcass band forming drum and in which the carcass band is received, bead members are enclosed at both ends of the carcass band and tire side wall forming members are pasted to the carcass band to form a green case and a band transfer reciprocating between the above mentioned carcass band forming drum and green case forming drum to transfer the carcass band from the carcass band forming drum to the green case forming drum. The invention includes a second stage forming means comprising a belt-tread structure forming drum forming an annular belt-tread structure, a raw tire forming drum which is arranged on the same axis as the belt-tread structure forming drum and on which the above mentioned green case is expanded to be toroidal inside the belt-tread structure to be pressed and bonded with the belt-tread structure to form a raw tire and a belt-tread transfer reciprocating between the above mentioned belt-tread structure forming drum and raw tire forming drum to transfer the belt-tread structure from the belt-tread structure forming drum to the raw tire forming drum and to take the completed raw tire out of the raw tire forming drum. The above mentioned first stage forming means and second stage forming means are so arranged that the respective forming drums may be positioned on the same axis and a green case transfer transferring the green case from the above mentioned green case forming drum to the raw tire forming drum and which is able to reciprocate between both forming means and to rise and fall in the vertical direction is set above the above mentioned first stage forming means and second stage forming means. Therefore, another object of the present invention is to obtain a compact economical apparatus which is high in handlability wherein, as the respective forming drums are arranged as mentioned above and are organically connected with one another through the respective transfers, accurate and strong forming operations high in precision can be made on the respective forming drums and mechanical and automatic transferring. Feeding and delivering operations can be made by the respective transfers to manufacture radial tires at a high level of productivity and high quality and factory space is effectively utilized.

The green case transferring means in the radial tire manufacturing apparatus according to the present invention is suggested to overcome the conventional disadvantages. Its object is to provide a green case transferring means in a tire manufacturing apparatus wherein a series of operations for transferring the green case assembled in the first stage forming means to the second stage forming means are mechanically and automatically made to correct the above mentioned defects. The formation is also simple and no extra floor space is required.

According to the present invention, a green case transfer is provided in a radial tire manufacturing apparatus which includes green case transferring means comprising running means set above the first stage forming means and second stage forming means arranged on the same axis and so as to be reciprocatable parallelly along the above mentioned axis, elevating means set in the running means and vertically elevating and lowering the green case which is kept horizontal only in the lowered position for receiving the green case from the above mentioned first stage forming means and in the lowered position for delivering the green case to the above mentioned second stage forming means and an expansible gripping means set in the elevating means and gripping the green case from the outside. The green case assembled in the first stage forming means is taken out in the axial direction as it is gripped from outside by the gripping means, the elevating means rises in this position while keeping the green case horizontal, then the running means moves to the second stage forming means side and stops in a predetermined lowered position, the elevating means lowers in this position, then, while the drum of the second stage forming means is contracted in diameter, when the running means moves to position the green case on the above mentioned drum and the drum grips the green case, the gripping means will release the green case and will return and, by repeating this operation, the green case assembled in the first stage forming means can be mechanically and automatically transferred to the second stage forming means. Therefore, an object of present invention is to provide a green case transferring means wherein various defects of the conventional means can be corrected. Since the transferring means is set to utilize the upper space, no special floor space is required. Since the elevating means is so made as to elevate and lower the gripping means in the vertical direction only in the predetermined lowered positions, the length of the transferring means can be made to a required minimum, the elevating and lowering power source can be easily fed and the formation is simple.

Further, another object of the present invention is to provide a green case transferring means which can positively center and grip a green case, is light in the weight, is simple in formation and is economical.

According to the present invention, such green case transferring means as in the following is provided. That is to say, there is provided a green case transfer in a tire manufacturing apparatus for an outside gripping of a cylindrical green case assembled in the first stage forming means and transferring it to the second stage forming means wherein the gripping mechanism for the outside gripping of the green case is formed of three gripping pawls, one of the gripping pawls is made movable vertically up and down and the other two of them are rockably mounted so as to expand and contract as they are operatively connected with the vertical movement of the vertically movable gripping pawl on both sides of this gripping pawl. As a result, there can be provided a light, compact and economical green case transfer wherein, as the gripping means is so made that, by vertically moving one of the gripping pawls, the two gripping pawls rockably mounted on both sides of the vertically moved pawl can be expanded and contracted as they are vertically connected, the green case can be positively centered and gripped from outside and the expanding and contracting formation of the gripping pawls is simplified.

Embodiments of the present invention shall be explained in the following with reference to the accompanying drawings.

BRIEF DESCRIPTION OF THE DRAWINGS

FIG. 1 is a plan view of an entire apparatus showing an embodiment of the present invention;

FIG. 2 is a side view of FIG. 1;

FIG. 3 is a sectioned view of an embodiment of a belt-tread structure forming drum, showing positions in the upper half and lower half which are different from each other;

FIG. 4 is a view on line IV—IV in FIG. 3 as seen in the direction indicated by the arrows;

FIG. 6 is a side view showing an embodiment of a green case transfer in the manufacturing apparatus of the present invention;

FIG. 7 is a right side view of FIG. 6;

FIG. 8 is a view on line VIII—VIII in FIG. 6 as seen in the direction indicated by the arrows;

FIG. 14 is a view on line XIV—XIV in FIG. 12 as seen in the direction indicated by the arrows;

FIG. 15 is a schematic side view showing the formation of a carriage frame, guide rails, wheels, brackets and arms in FIG. 12;

FIG. 16 is a schematic side view showing the formation of a carriage frame, guide rails, wheels and brackets;

FIG. 1 is a schematic side view showing the formation of a carriage frame, guide rails, wheels, brackets, pins and rods;

FIG. 18 is a schematic plan view showing the formation of a motor, winding drum, sprockets and a pulley;

FIG. 19 is an elevation of gripping means for gripping a green case used in the manufacturing apparatus of the present invention;

FIG. 20 is a side view of FIG. 19;

FIG. 21 is a side view of another gripping means for gripping a green case used in the manufacturing apparatus of the present invention;

FIG. 22 is a view on line XXII—XXII in FIG. 21 as seen in the direction indicated by the arrows;

DESCRIPTION OF PREFERRED EMBODIMENTS

Figure 5:
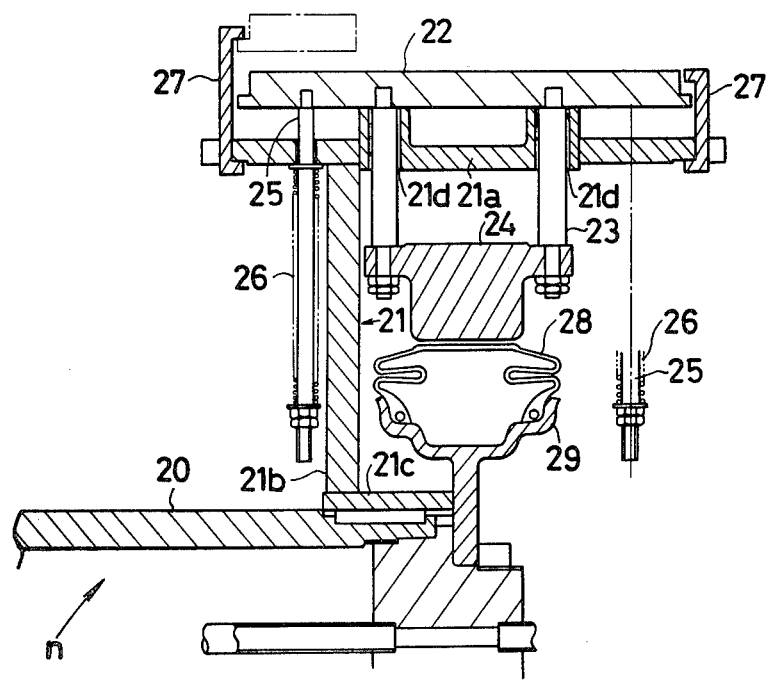
FIG. 5 is a sectioned view of an essential part of the invention showing a different embodiment of a belt-tread structure.

Embodiment 1 (See FIGS. 1 and 2)

In FIGS. 1 and 2, a first stage equipment shall be first explained. The reference symbol a denotes a carcass band forming drum of an expansible substantially cylindrical rigid body for forming a cylindrical carcass band, b denotes a fixed mount mounting the above mentioned drum a rotatably and stoppably and having an expanding mechanism, c denotes material feeding means feeding an inner liner, carcass ply and other reinforcing members forming a carcass band CB assembled on the above mentioned drum, d denotes a band transfer for gripping on the outside of the carcass band CB assembled on the above mentioned drum and transferring it from the above mentioned drum a to a later described green case forming drum f, e denotes a track and driving means for band transfer, d provided with a track in the upper part, f denotes a green case forming drum which receives the carcass band CB transferred by the above mentioned transfer d, sets bead cores in it and winds required materials forming side walls and a green case GC on the carcass band CB to form a green case, g denotes a fixed amount which mounts the above mentioned drum f rotatably and stoppably, has a drum f expanding mechanism and mounts bead setting means, ply-down means and turn-up means, h denotes a movable mount mounting the same bead setting means, ply-down means and turn-up means as in the above mentioned mount g, i denotes another track and driving means for moving the above mentioned mount h so as to intersect at right angles with the track of the above mentioned track and driving means e, j denotes a material feeding means for feeding such material as side walls and a rim cushion forming the green case GC assembled on the above mentioned drum f, k denotes a band forming stitching means and l denotes a green case forming stitching means.

The first stage equipment is formed of the members of the above reference symbols a to l. The band transfer d receives the carcass band CB in the illustrated position A from the material feeding means c, waits in the illustrated position B until the drum f can receive the carcass band CB, then delivers the carcass band CB in the illustrated position C to the drum f, then returns to the above mentioned position B, waits until the carcass band CB used for the next tire is completed on the carcass band forming drum a and then repeats the same movement.

By the way, the carcass band forming drum a, band transfer d and green case forming drum f are arranged on the same axis and the movable mount h is so arranged that the respective means on the mount h may be positioned on the same axis as that of the drum f.

Further, the above mentioned movable mount h is so made that, when the movable mount h moves on the track of another track and driving means i to be positioned on the same axis that as as of the drum f, the leg part of the mount h will not obstruct the track of the above mentioned track and driving means e. Further, the above mentioned movable mount h is positioned in the retracted position as illustrated so as not to obstruct the running of the band transfer d on the track and not to obstruct the operation of a green case transfer v in the later described respective embodiments.

The second stage equipment shall be explained in the following. In the drawings, the reference symbol m denotes a belt-tread structure forming drum of an expansible substantially cylindrical rigid body forming a belt-tread structure BT, n denotes a fixed mount mounting the above mentioned drum m rotatably and stoppably and having an expanding and contracting mechanism, o denotes material feeding means feeding belts, treads and other members to be assembled on the above mentioned drum m, p denotes a belt-tread transfer which grips the outside of the belt-tread structure BT assembled on the above mentioned drum m, transfers it from the above mentioned drum m to a later described drum r, outside grips a raw tire GT completed on the drum r, takes it out of the drum r and acts to deliver it to a tire discharging means u, q denotes a track and driving means for the above mentioned transfer p, r denotes a raw tire forming drum which inside grips and receives the bead parts of a green case GC transferred by the later described green case transfer v and makes the green case toroidal inside the belt-tread structure BT transferred by the above mentioned transfer p, s denotes a fixed mount mounting the above mentioned drum r rotatably and stoppably and having a mechanism making the gripping parts inside the green case GC relatively separable, t denotes a stitching means finally pressing and forming the belt-tread structure BT set in the above mentioned toroidal green case GC and u denotes a tire discharging means which receives the raw tire GT taken out in the axial direction by the above mentioned transfer p and discharges the tire out of the equipment. The second stage equipment is formed of the members of the above reference symbols m to u.

Further, in order to organically connect the above mentioned first stage equipment and second stage equipment with each other, there are positioned a green case transfer v which outside grips the green case GC assembled on the green case forming drum f of the first stage equipment and inserts the green case GC into the raw tire forming drum r of the second stage equipment and an overheard type track w (which may be suspended from the ceiling or can be supported by pillars from the ground) for the above mentioned transfer v.

The above mentioned drum m, transfer p and drum r of the second stage equipment are arranged on the same axis X—X and the discharging means u is so made as to be able to reciprocate between the two positions one of which is on this axis and the other is a discharging position.

Further, the transfer p receives the belt-tread structure BT in the position D illustrated in FIG. 2 from the belt-tread structure forming drum m, waits in the illustrated position E until the drum r can receive the structure BT, then delivers the structure BT in the illustrated position G to the green case GC, returns to the above mentioned position E, waits until the assembly of the tire on the drum r is completed, is again in the position G to receive the completed raw tire, delivers the completed raw tire GT in the position F to the tire discharging means u, is again in the position G so that the tire discharging means u may not obstruct the movement of the transfer p, then moves to the position E, waits until the belt-tread structure BT to be used for the next tire is completed and repeats to receive and deliver the belt-tread structure and to take out and deliver the completed tire.

Further, the green case transfer v outside grips the green case GC assembled on the drum f in the position C, takes out the green case GC in the position H, then transfers it to the second stage equipment side in the upper position H', waits in the position I' until the drum r can receive the green case GC, is then in the lower position I, is further in the position G to deliver the green case GC to the drum r, is returned to the position H' through the above mentioned positions I and I', waits until the green case GC to be used for the next tire is completed on the drum f and then repeats the same operation.

The above mentioned respective elements shall be explained in the following. The carcass band forming drum a is an expansible substantially cylindrical rigid drum having an outer peripheral length which will be equal or substantially equal to the inner peripheral length of the carcass band CB to be assembled when the drum is expanded and may be made smaller than the inner peripheral length of the assembled carcass band when the drum is contracted in the diameter. Such known band forming drum as is shown, for example, in Japanese Laid Open Patent application No. 124639/1980 or Japanese Patent Publication No. 47957/1977 is adopted.

The fixed mount b mounts the above mentioned carcass band forming drum a rotatably and stoppably, has the above mentioned drum a expanding and contracting driving mechanism and is further provided with a stopping position control for dispersing the winding beginning positions of the respective materials, that is, the joints of the materials in the peripheral direction as expected. Such known expanding and contracting mechanism as is shown, for example, in Japanese Patent Publication No. 19871/1976 or 17063/1977 is adopted.

Further, the material feeding means c is a so-called servicer, is to feed component members of the carcass band CB assembled on the above mentioned drum a and has many known examples.

The band transfer d has expansible segments which outside enclose the carcass band CB assembled on the above mentioned drum a and outside grip the outside surface partly or wholly. This expanding and contracting mechanism is provided on a movable carriage which is made to run on the track of the track and driving means e. Such mechanism as is exemplified, for example, in Japanese Patent Publication No. 38265/1980 can be adopted if it is partly modified.

Further, the band transfer track and its driving means e is a track and driving means making the above mentioned band transfer d reciprocate between the above mentioned drum a position and the later described green case forming drum f position and is well known. However, the driving means e is provided with a stopping position controlling and adjusting means so as to stop precisely in the above mentioned drum a position A and drum f position C and has an intermediate position B in addition to the above mentioned two positions as a waiting position so as not to obstruct the forming operations on the above mentioned drum a and the later described drum f.

Further, the green case forming drum f is to receive the carcass band CB assembled on the above mentioned carcass band forming drum a and transferred by the above mentioned band transfer d and then assemble such members required to form the green case as bead cores and side walls in a predetermined procedure. Many known drums are usable for this. Particularly such so-called radially expanding drums as are shown, for example, in Japanese Patent Publication Nos. 31734/1980, 21669/1976, 31910/1975 and 25580/1978 can be enumerated.

The above mentioned fixed mount g is a so-called headstock means, mounts the above mentioned drum f rotatably and stoppably, is provided with the above mentioned drum f expanding and contracting driving mechanism, a stopping position control for dispersing the winding beginning position of the respective materials, that is, the joints of the materials in the peripheral direction as expected, further a so-called ply-down means inward transforming the overhanging parts of the carcass band on the drum f, a so-called bead setting means setting bead cores coaxially with the above mentioned drum f after the ply-down, a so-called turn-up means enclosing the bead cores with the above mentioned overhanging parts and driving means for the respective means and has many known examples.

The movable mount h is also so well known that its detailed explanation shall be omitted.

Further, the track and driving means i is a so-called tailstock means, is provided with the ply-down means of the above mentioned fixed mount g, bead setting means and the same means as the respective driving means, is made to move on the track of another track and driving means arranged at right angles with the above mentioned track and driving means e, is stopped in the advancing position so as to be coaxial with the above mentioned drum f and is well retracted in the retreating position so as not to obstruct the passage of the above mentioned band transfer d on the track of the track and driving means e and the operation of the latter described green case transfer v. Many known examples exist.

The material feeding means j is a so-called servicer, feeds such component members of the green case GC assembled on the above mentioned drum f as, for example, side walls, bead reinforcing members and rim cushions and is known as is the above mentioned material feeding means c.

Further, the band forming stitching means k is a pressing and bonding means for pressing the respective wound materials positively to be bonded with each other after the required materials are mounted on the above mentioned carcass band forming drum a and has many known examples.

The green case forming stitching means 1 is a pressing and bonding means for pressing and bonding the belt-turned parts as required after the bead cores are set on the drum f and then the overhanging parts are turned back and pressing the later combined side walls, bead reinforcing members and rim cushions positively to be bonded with each other and has many known examples.

In the second stage equipment, the belt-tread structure forming drum m is an expansible substantially cylindrical rigid drum having an outer peripheral length which will be equal or substantially equal to the inner peripheral length of the belt to be assembled when the drum is expanded and may be smaller than the inner peripheral length of the assembled belt-tread structure when the drum is contracted in diameter. Such known drums as are shown, for example, in Japanese Laid Open Patent Application No. 135647/1980 and No. 135648/1980 are adopted.

Further, improved drum means shown as later mentioned embodiments of the present invention respectively in FIGS. 3, 4 and 5 are adopted. The later mentioned embodiments are so much higher in rigidity on the cylinder surface than the above two known examples as to be improved in respect that a positive pressed and bonded formation is made possible, the direction of the segments forming the outer surface when the materials are wound is always constant and a precise belt is assembled. Particularly, the second embodiment shown in FIG. 5 has advantages that the number of divisions can be increased to be so many that a drum close to a true cylinder can be provided and, as an assembly with a rim of a collapsible spare tire usually called a space saving tire and used for automobiles is utilized for the expansion, though the number of divisions is high, the drum is economical in addition to the above mentioned advantages.

Next, the fixed mount n is a so-called headstock means, mounts the above mentioned belt-tread structure forming drum m rotatably and stoppably, has means of feeding compressed air for expanding the above mentioned drum m, is provided with a stopping position control for dispersing the winding beginning positions of the respective materials, that is, the joints of the materials in the peripheral direction as expected and is so well known that a detailed explanation shall be omitted.

The material feeding means o is a so-called servicer, feeds the component members of the belt-tread structure assembled on the above mentioned drum m and has so many known examples that a detailed explanation shall be omitted.

Further, the belt-tread transfer p has expansible segments for outside enclosing the belt-tread structure assembled on the above mentioned drum m and for outside gripping the outer surface partly or wholly. This expanding and contracting mechanism is provided on a movable carriage and this carriage is made to run on the track of the transfer p track and driving means q. Such examples as are shown in Japanese Patent Publication Nos. 1951/1977 and 2625/1975 are adopted.

The above mentioned belt-tread transfer p track and driving means q is a track and driving mechanism making the above mentioned belt-tread transfer p reciprocate between the above mentioned drum m position and the later described raw tire forming drum r position and is known but is provided with a stopping position control and adjusting means so as to stop the transfer p precisely in the above mentioned drum m position D and drum r position G. This stopping position control is made to control a series of operations so that the belt-tread transfer p receives the belt-tread structure BT in the position D, waits in the position E until the drum r can receive the structure BT, then delivers the structure BT in the position G to the green case on the drum r, returns to the above mentioned position E, waits until the assembly of the raw tire on the drum r is completed, is again in the position G, receives the completed raw tire, delivers the completed tire in the position F to the tire discharging means u, is again in the position G so that the tire discharging means u may not obstruct the movement of the transfer p, moves to the position P, waits until the belt-tread structure to be used for the next tire is completed on the drum m and then receives the structure in the position D.

Further, the raw tire forming drum r inside grips both side bead parts of the green case which was assembled on the drum f of the first stage equipment and was transferred by the green case transfer v and makes the green case toroidal while relatively and synchronously bringing closer the bead parts of the above mentioned green case inside the belt-tread structure BT which was assembled on the above mentioned drum m and transferred by the belt-tread transfer p. The above mentioned bead part inside gripping part is made expansible and synchronously separable so as to hold the bead parts substantially circular when the gripping part expands and to be smaller than the inside diameter of the bead of the green case when it contracts in diameter.

Such example as is shown, for example, in Japanese Patent Publication No. 11310-1978 is adopted here.

Next, the stitching means t represents a pressing and bonding means for positively bonding the belt-tread structure and toroidal green case with each other after the belt-tread structure is delivered to the torodial green case on the above mentioned drum r. Such structure as is shown, for example, in Japanese Patent Publication No. 18275/1976 is adopted.

Further, the tire discharging means u is used to receive the green case which is completed on the above mentioned drum r and is taken out of the drum r by the above mentioned transfer p while supporting the inner peripheral parts of the beads and discharge it out of the equipment. Such structure as is shown, for example, in "Device for Taking Tires out of a Tire Forming Machine" of Japanese Patent Application No. 59517/1981 filed in Japan by the present applicant on Apr. 20, 1981 is adopted.

The green case transfer v comprises gripping means having expansible gripping pawls which outside enclose the green case assembled on the above mentioned drum f of the first stage equipment and outside grip its outer surface and an elevating and transferring means.

Embodiment 2 (See FIGS. 3 and 4)

Improvements in the belt-tread stucture forming drum in the second stage equipment are shown here.

A shaft 1 is rotatably mounted on a fixed mount n. As illustrated, a sleeve 2 is fixed to the shaft 1 so as to have no freedom in the axial direction or peripheral direction of the shaft.

The above mentioned sleeve 2 has a disk 3 in a proper place. The reference numeral 4 denotes a plurality of bearing boxes (12 in the drawing) which are provided on the outer surface of the above mentioned disk 3 and along the periphery in the radial direction and guide in the radial direction as many rods 6 as the bearing boxes 4 and secured to as many arcuate segments 5 as the bearing boxes 4 and forming a substantial cylinder to wind materials.

A guide block 8 connected to a link 7 is provided at the radially inward end of the above mentioned rod 6 and restrains the rotating freedom around the rod 6 of the above mentioned segment 5 in cooperation with the plane part of the disk 3. The above mentioned link 7 is connected at the other end to a bearing 10 on a sleeve 9 make slidable in the axial direction on the above mentioned sleeve 2. A diaphragm type cyllinder 11 is fixed at one end to the above mentioned sleeve 9. On the other hand, the above mentioned cylinder 11 is fixed at the other end to a disk 12 fixed to the above mentioned sleeve 2. Compressed air is to be fed to the above mentioned diaphragm type cylinder 11 through a hole (not illustrated) within the above mentioned shaft 1. This compressed air is fed from outside the apparatus through a so-called rotary seal at the end (not illustrated) of the shaft 1.

A plurality of rods 13 are secured to the disk part of the above mentioned sleeve 9. The rod 13 passes at the other end through the disk 3 of the above mentioned sleeve 2 and has nuts 15 and 16 screwed at the end. A compression coil spring 14 is incorporated coaxially with the above mentioned rod 13. By the above mentioned nuts 15 and 16, the free extension of the above mentioned coil spring 14 is regulated and therefore the diameter contraction limit of the segment 5 is regulated.

Therefore, according to the above mentioned structure, with compressed air, the diaphragm type cylinder 11 will extend against the resiliency of the coil springs 14 and will move the sleeve 9 in the axial direction and the respective segments 5 will be synchronously expanded radially outwardly by the action of the links 7 and, when the compressed air is removed, the respective segments 5 will be contracted in the diameter by the resiliency of the coil springs 14.

The most essential feature of this kind of drum means is that the radial positions of the respective segments when expanded should be precisely determined from the necessity of forming belts having various diameters. In this embodiment, it is attained by inserting a spacer 17 which is u-shaped in the horizontal section between the above mentioned guide block 8 and bearing box 4.

Preferably the above mentioned spacer 17 has a permanent magnet.

Embodiment 3 (See FIG. 5)

Improvements in the belt-tread structure forming drum shown in Embodiment 2 are shown here.

In the case of Embodiment 2, as the link 7 setting space is restricted, the divisions of the segments 5 can not be so many and, if one drum is to be realized over a wide range of winding diameters, a large clearance will be produced between the respective segments. However, this Embodiment 3 has advantages that the divisions of the segments can be several times as many as in the above mentioned embodiment and therefore the clearance between the respective segments can be made small.

A shaft 20 is rotatably mounted on a mount n.

As illustrated, a drum base 21 consisting of a cylinder part 21a, disk part 21b and sleeve 21c is fixed to the shaft 20 so as to have no axial or peripheral freedom. The above mentioned cylinder part 21a is provided with sliding bearings 21d radially inwardly guiding respective guide rods 23 two of which are provided per segment 22. Further, as many segments 24 as the above mentioned segments 22 are fixed to the radially inward ends of the above mentioned guide rods 23. Each of the above mentioned segments 22 is further provided with two rods 25 in addition to the guide rods 23. The rod 25 projects radially inwardly through a through hole (of a diameter larger than of the rod 25) of the above mentioned cylinder part 21a. A pair of compression coil springs 26 are incorporated coaxially with the respective rods 25.

The above mentioned compression coil spring 26 is incorporated as provided in advance with a resiliency to pull the segment 22 radially inwardly.

The above mentioned segment 22 has at both ends projections for regulating its radial positions and made to contact the projecting parts of regulating rings 27 removably fitted to the ends of the above mentioned cylinder part 21a.

The regulating ring 27 is shown on the right in FIG. 5 when the expanded diameter is small and on the left when the expanded diameter is large.

A collapsible tire 28, called a space saving tire and used as a spare tire for automobiles, and a rim 29 fitting this tire and arranged radially inwardly of the above mentioned segments 24. The above mentioned rim 29 is fixed to the above mentioned shaft 20. A compressed air pipe coming through the shaft 20 is connected to the rim 29.

As this embodiment is formed as in the above, with pressure air passing through the above mentioned shaft 20, the collapsible tire 28 becoming larger in diameter will be inflated against the resiliency of the springs 26, will expand the segments 22 through the segments 24 and rods 23 and will be made to be of a predetermined diameter by the regulating rings 27. When the pressure within the tire 28 is removed, the segments 22 will be returned by the resiliency of the compression coil springs 26 to be contracted in diameter.

Embodiment 4 (See FIGS. 6 to 8)

Improvements in the green case transfer in the radial tire manufacturing apparatus of the present invention are shown here.

The green case transfer v consists of carriage means v-1 provided with elevating and running means and gripping means v-2 and is made to run on a track w-1 supported from the ceiling or the ground as shown in FIGS. 1 and 2. The reference symbol w-2 denotes an auxiliary beam supporting the above mentioned track w-1.

The above mentioned carriage means v-1 is formed of wheels 30 rolling on the lower side of the above mentioned track w-1, a carriage frame 31 rotatably mounting the wheels 30, an arm 32 made rotatable on the above mentioned frame 31, a bracket 33 rotatably suspended at the rotary end of the above mentioned arm 32, balance rods 34 each rotatably fitted at one end to the above mentioned bracket 33 and at the other end to the above mentioned frame 31 and an elevating driving means provided on the above mentioned frame 31.

The rotation center of the above mentioned arm 32, the fitting center of the arm 32 on the bracket 33, the fitting centers of the above mentioned balance rods 34 on the above mentioned bracket and the other fitting centers of the above mentioned balance rods 34 on the above mentioned frame 31 are so arranged as to respectively form parallelograms. Therefore, the gripping means v-2 secured to the above mentioned bracket 33 are kept horizontal in the respective positions of the rotation of the arm 32. Further, the above mentioned elevating driving means is formed of a motor 35 provided on the frame 31, a rotatable wire winding drum 37 connected to the motor 35 through a chain 36, a pulley 38 rotatably mounted on the above mentioned frame 31 and a wire rope 39 fixed at one end to the above mentioned wire winding drum 37 and at the other end to a proper place of the above mentioned arm 32. Therefore, when the wire winding drum 37 is driven, the wire rope 39 will be wound up in a spiral groove made on the drum 37 and the arm 32 will elevate the gripping means v-2 which is kept horizontal from the state shown by the solid lines in FIG. 6 to the state shown by the chain lines.

The elevation limit position is not illustrated but is detected by a known limit switch provided on the frame 31 to stop the motor 35. On the other hand, in lowering the gripping means, when the above mentioned motor 35 is reversely rotated to rotate the wire winding drum 37 in the direction of releasing the wire rope 39, the arm 32 and others will rotate downwardly by their weight until the rear projecting part of the arm 32 contacts a stopper 40 provided on the above mentioned frame 31.

The lowering limit is not illustrated but is detected by a known limit switch provided on the frame 31 to stop the motor 35.

FIG. 6 shows that the green case GC on the above mentioned green case forming drum f is outside gripped by the gripping means v-2 and is pulled off in the axial direction and that the carriage frame 31 of the transfer is stopped in contact with a stopper 41 fixed on the track w-1.

The running of the carriage will be sensed by a known limit switch (not illustrated) provided in the stopper 41 part and a running driving motor (not illustrated) provided in a proper place on the track w-1 will be stopped. Then, the motor 35 will be driven to rotate the arm 32, the gripping means v-2 will be in the upper position, then a running motor (not illustrated) will be driven and a wire rope (not illustrated) fixed to a proper place of the carriage frame 31 will be pulled to run toward the drum r.

On the contrary, the transfer v having returned from the raw tire forming drum r will be stopped in contact with the above mentioned stopper 41, then the gripping means v-2 will be lowered and the arm 32 will be stopped from lowering in contact with the stopper 40 and will be again moved to the drum f side. The stopping position of the gripping means v-2 with respect to the drum f will be determined as indicated by the arrow X in FIG. 6 by the stopper 42 on the above mentioned track w-1 and the above mentioned arm 32 and the running will be stopped by a known limit switch (not illustrated).

As the rear end part of the above mentioned arm 32 is T-shaped as shown in FIG. 7, in case the arm 32 in the upper limit position, that is, as illustrated by the one-point chain lines, runs to the drum r side, the above mentioned stopper 42 will not obstruct the movement of the carriage means v-1. Further, the carriage means having the gripping means v-2 in the upper limit position will be transferred to the drum r side and will once stop in the position I' where it is lowered. This stopping position will be sensed by a known limit switch (not illustrated) provided on the track w-1 by sensing that the carriage frame 31 has come to the stopping position. I'. After waiting until the drum r needs the green case GC, the motor 35 will be driven to rotate the arm 32 and the gripping means v-2 will be in the same lower limit position as is shown in FIG. 6. Therefore, the state in the drum r position will be seen by replacing the drum f illustrated in FIG. 6 with the drum r and the stopper 41 with a limit switch. The transfer will be stopped in the drum r position G by the same stopper (not illustrated) as the stopper 42.

Figure 9:
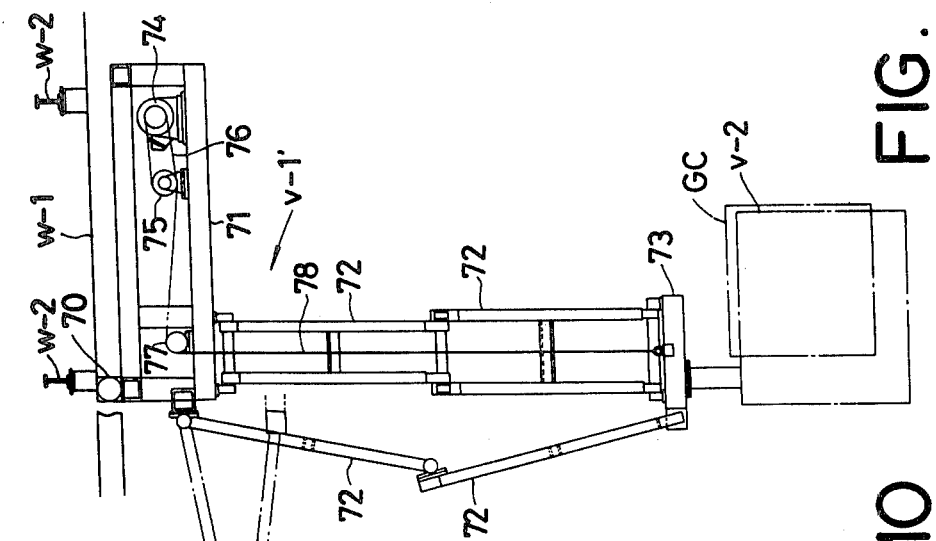
FIG. 9 is a side view showing another embodiment of the green case transfer in the manufacturing apparatus of the present invention.
Figure 10:
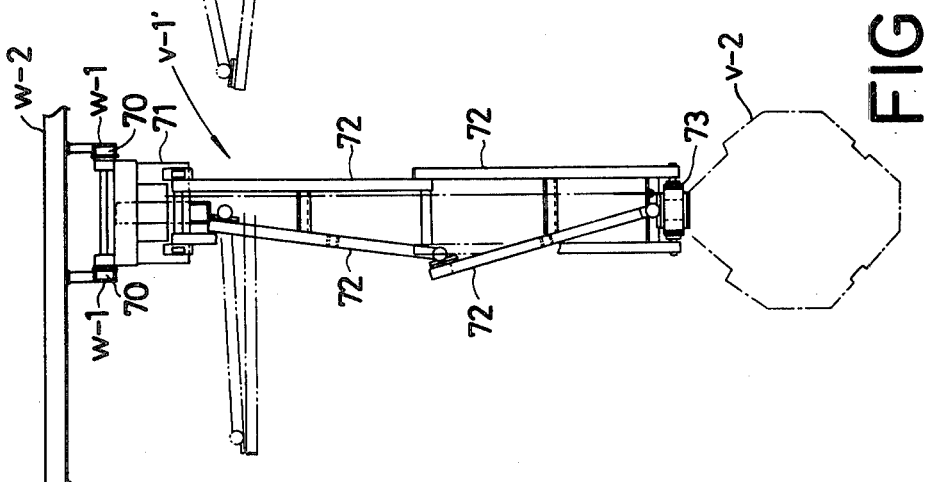
FIG. 10 is a right side view of FIG. 9.

Embodiment 5 (See FIGS. 9 and 10)

Further improvements in the green case transfer are shown here.

Carriage means v-1' runs on the track w-1. The track w-1 is held from the ground in the illustration but may be suspended from the ceiling. The reference symbol w-2 denotes an auxiliary beam supporting the track w-1.

The carriage means v-1' shown in this embodiment is formed of wheels 70 rolling on the above mentioned track w-1, a carriage frame 71 rotatably mounting the wheels 70, double pivotal arms 72 suspended from the above mentioned frame 71, a bracket 73 for fitting the gripping means v-2 suspended from the arms 72 and an elevating driving means provided on the above mentioned frame 71.

Two of the above mentioned pivotal arms 72 are provided and are so arranged as to be pivoted in directions at right angles with each other. The above mentioned driving means is formed of a motor 74 fixed to the frame 71, a wire winding drum 75, a chain connecting the motor 74 and drum 75 with each other and a wire rope 78. The wire rope 78 is fixed at one end to the above mentioned drum 75 and is fixed to the above mentioned bracket 73 through a pulley 77 rotatably provided on the frame 71. Therefore, when the motor 74 is driven and the wire rope 78 is wound up by the winding drum 75, the above mentioned arms 72 will be pivoted to be in the upper position as illustrated and will be able to lift the gripping means v-2 as it is kept horizontal. Stopping in the upper limit and lower limit positions will be sensed by a known limit switch (not illustrated) and will be attained by stopping the drive of the motor 74.

Further, the running method of this embodiment is the same as in the first embodiment. The running stopping position near the above mentioned green case forming drum f and raw tire forming drum r will be sensed by a known limit switch not illustrated.

Embodiment 6 (See FIGS. 11 to 18)

Further improvements in the green case transfer are shown here.

The green case transfer is formed of a track G-1, elevating and running means G-2 and gripping means G-3.

Figure 13:
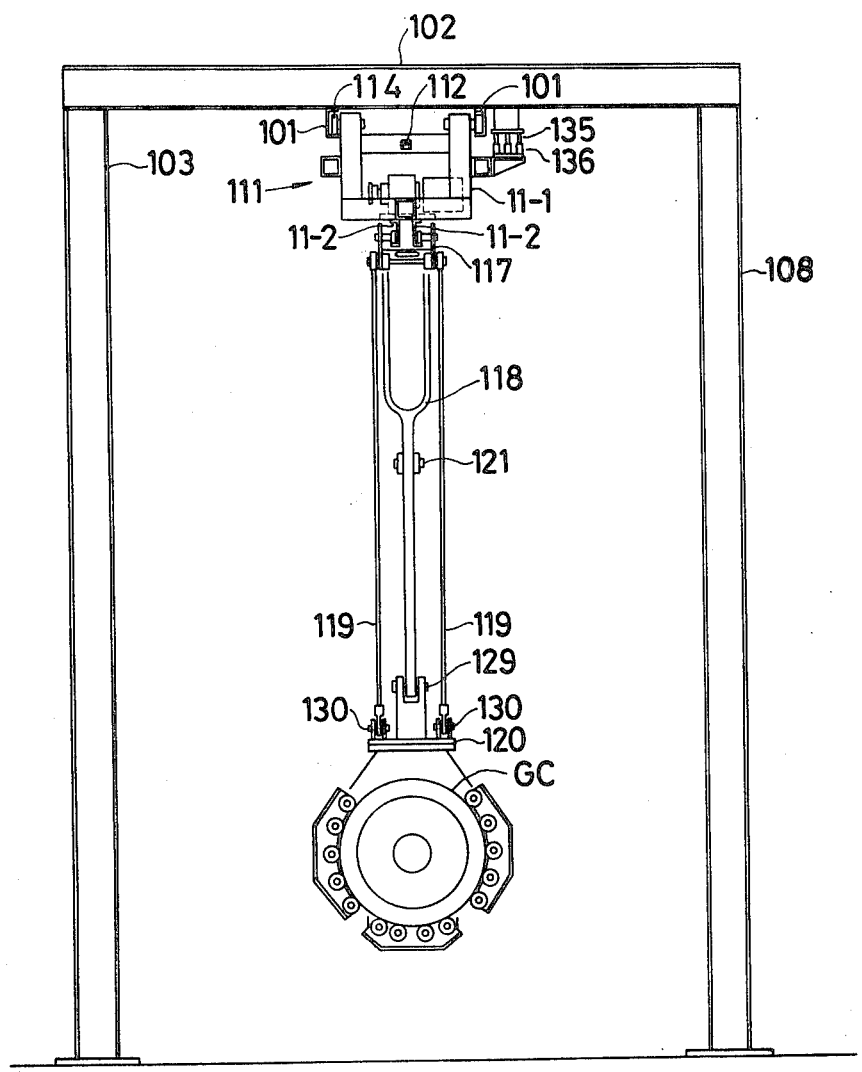
FIG. 13 is a right side view of FIG. 12.

The track G-1 comprises rails 101 parallelly arranged above the axis X—X, lateral beams 102 for supporting the rails 101 from the ceiling or with pillars from the ground as shown in FIG. 13 and stoppers 104 and 105 provided in proper places of the rails 101. The stopper 104 is to determine the position $Y_1-Y_1$ in which the transfer v begins to lower to receive the green case GC on the green case forming drum f and is made to contact the carriage part of the transfer v. The stopper 105 is to determine the stopping position $Y_4-Y_4$ in which the transfer v delivers the green case GC to the raw tire forming drum r and is made to contact the carriage part of the transfer v.

By the way, a fixed position $Y_2-Y_2$ stopping stopper for receiving the green case on the drum f and a movable stopper for determining the position $Y_3-Y_3$ in which the transfer begins to lower to deliver the green case to the above mentioned drum r are provided in addition to the above mentioned stoppers but are not illustrated.

Figure 11:
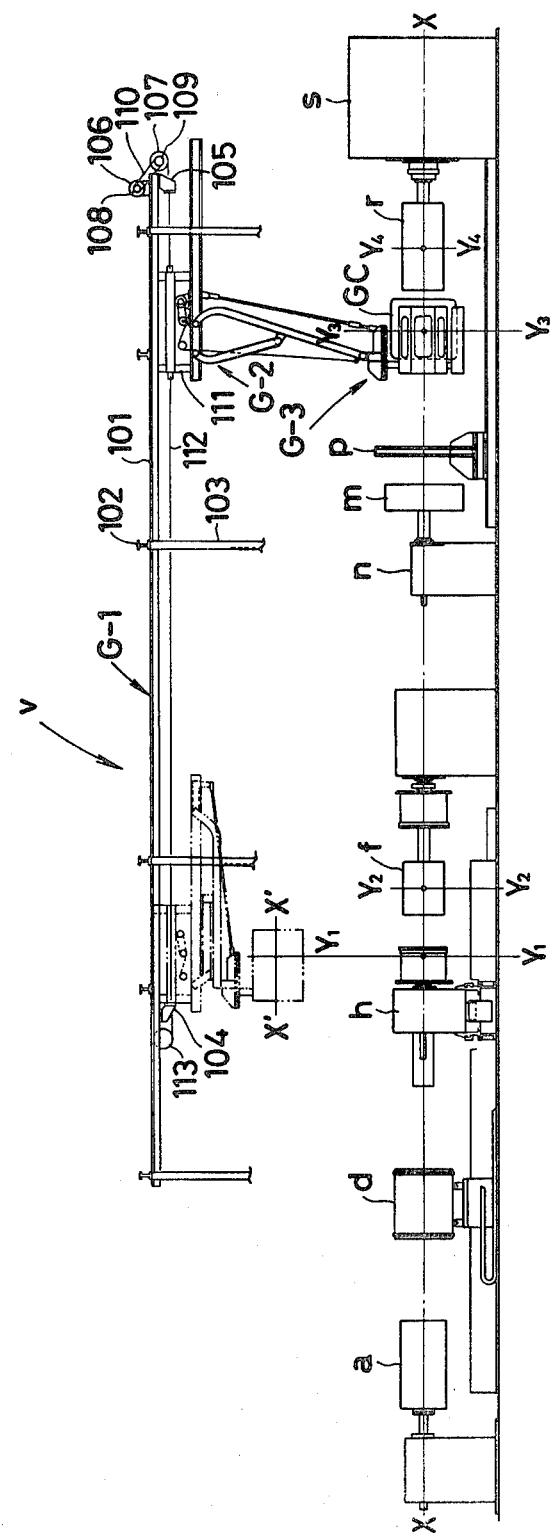
FIG. 11 is a general side view of a radial tire manufacturing apparatus provided further with another green case transfer.

The above mentioned elevating and running means G-2 has driving means comprising, with reference to FIG. 11, a motor 106 fixed to a proper place of the above mentioned rails 101, wheels 107 rotatably mounted on the rails 101, a chain 110 connecting a sprocket 108 provided on the output shaft of the above mentioned motor 106 and a sprocket 109 provided on the input shaft of the above mentioned wheel 7 with each other, a wire rope 112 fixed at both ends to proper places of a carriage frame 111 and driven by the above mentioned wheels 107 and a wheel 113 rotatably mounted on the above mentioned rails 101 to give a proper tension to the above mentioned wire rope 112 and the above mentioned carriage frame 111 has a plurality of wheels rolling on the rails 101. Therefore, when the motor 106 is rotated, the wire rope 112 will be pulled and the carriage frame 111 will be able to be made to run to the right or left as seen in FIG. 11. When it comes to the pedetermined positions $Y_1-Y_1$, $Y_2-Y_2$, $Y_3-Y_3$ and $Y_4-Y_4$, the correct position will be sensed by the stoppers 104 and 105, stoppers (not illustrated) and limit switches (not illustrated) and, by stopping the motor, the carriage will be able to be stopped in the predetermined positions.

Figure 12:
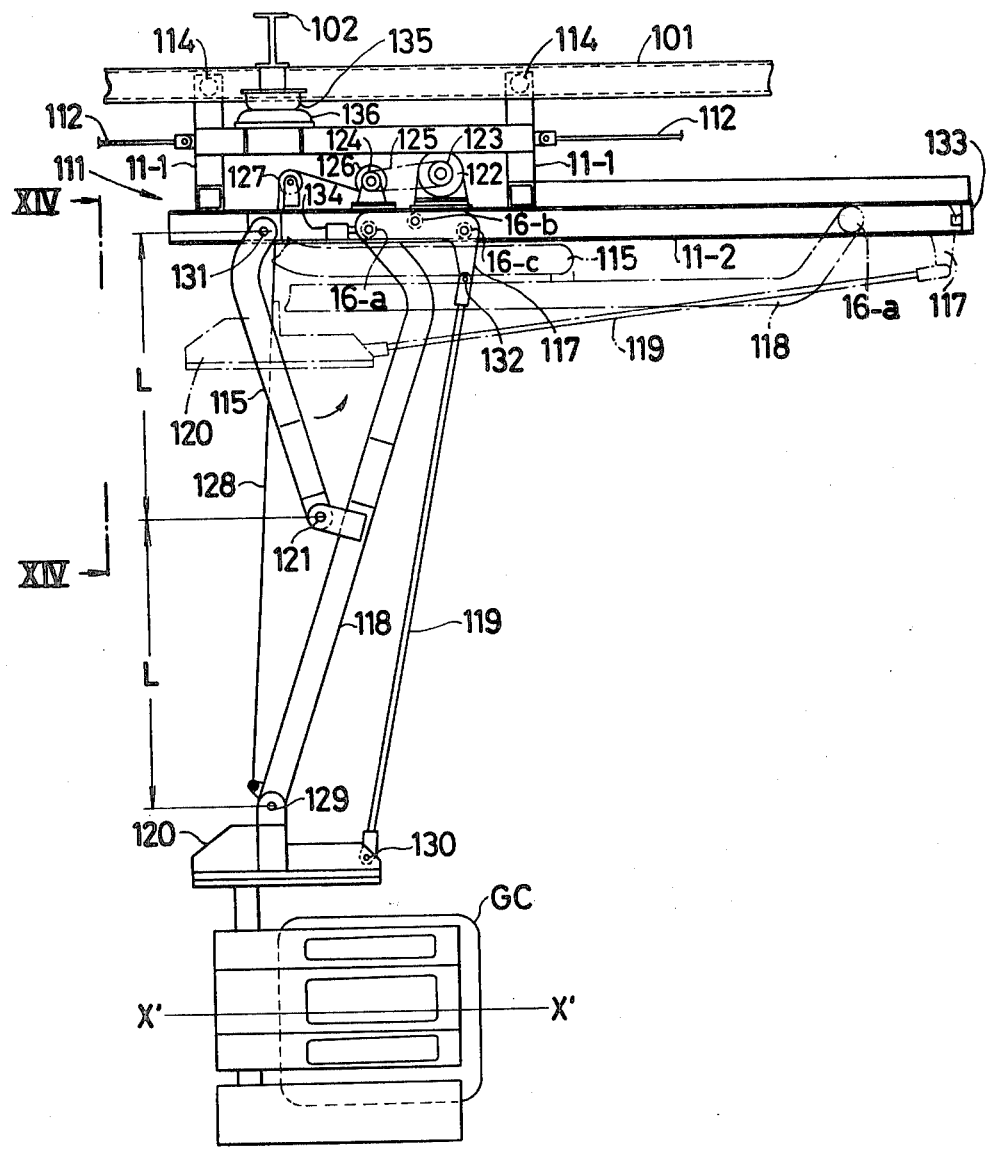
FIG. 12 is an enlarged side view of the green case transfer shown in FIG. 11.

Further, with reference to FIGS. 12 and 13, the carriage frame 111 has elevating means comprising pillars 11-1 mounting wheels 114 rolling on the rails 101, guide rails 11-2 fixed to proper places of the pillars 11-1 and arranged in parallel with the rails 101, arms 115 rockably suspend by pins 131 in proper places of the above mentioned rails 11-2, wheels 16-a, 16-b and 16-c rolling on the above mentioned rails 11-2, brackets 117 mounting the wheels 16-a to c, an arm 118 rockably suspended on the shaft of the wheel 16-a as a center, a rod 119 rockably suspended by a pin 132 in a proper place of the above mentioned bracket 117, a bracket 120 suspended by pins 129 and 130 at the other ends of the above mentioned arm 118 and rod 119, a pin 121 connecting a proper place of the above mentioned arm 118 and the above mentioned arm 115 with each other, a motor 122 provided with an excited open type brake and fixed to a proper place of the above mentioned carriage frame 111, a winding drum 126 driven through sprockets 123 and 124 and a chain 125 driven by the above mentioned motor, a pulley 127 rotatably mounted in a proper place of the carriage frame 111 and a wire rope 128 fixed at one end to the above mentioned winding drum 126 and at the other end to the tip of the above mentioned arm 118.

Here, when the interaxial distance between the pin 131 and pin 121 is made L, the interaxial distances between the wheel 16-a and pin 121 and between the pin 121 and pin 129 will also be L, the axis of the wheel 16-a and the axes of the pin 121 and 129 will be on an imaginary straight line and the axis of the pin 131 will be on an imaginary vertical line passing through the axis of the pin 129.

Further, the axes of the pin 131 and wheels 16-a and 16-c are so arranged as to be on an imaginary horizontal line, further the axes of the wheel 16-a and pins 129, 130 and 132 are so arranged as to form a parallelogram. Therefore, when the motor 122 is rotated and the winding drum 126 is driven, the wire rope 128 will be wound up, the arm 115 will rock or pivot counterclockwise in FIG. 12, the brackets 117 will move to the right on the guide rails 11-2 and the locus of the pin 129 will move vertically upwardly from the initial position while keeping the bracket 120 horizontal and will be, as shown by the one-point chain lines in FIG. 12, at the rising limit, the brackets 117 will contact the stopper 133 provided on the guide rail 11-2, at the same time, the limit switch (not illustrated) will be operated and the rotation of the motor 122 will be stopped.

On the other hand, when the motor 122 is reversely rotated and the winding drum 126 is reversely rotated, the arms 115 and 118 will be lowered under their own weight and the weight of the gripping means part to be as shown by the solid lines in FIG. 12. As soon as the bracket 117 contacts the stopper 134 provided in a proper place on the rails 11-2, the limit switch (not illustrated) will be operated and the rotation of the motor 122 will be stopped.

As the above mentioned elevating operation is made only in the positions $Y_1-Y_1$ and $Y_3-Y_3$, an electricity distributing shoe 135 fixed to a proper place on the rail 101 side and an electricity receiving shoe 136 fixed to a proper place of the carriage frame 111 are arranged so that the power source of the above mentioned motor 122 may receive electricity from outside only in the above mentioned two positions. Therefore, after the rising limit is reached, while running through $Y_1$—$Y_1$ to $Y_3$—$Y_3$ on the rails 101, the motor 122 will not be driven, that is, the means will not lower. Also, after the lowering limit is reached, even if the carriage runs through $Y_1$—$Y_1$ to $Y_2$—$Y_2$ and $Y_3$—$Y_3$ to $Y_4$—$Y_4$, the motor 122 will not be driven, that is, the means will not rise.

Therefore, while the carriage is running, the means will not rise or lower by mistake. The equipment can be prevented from being damaged and thick power lines need not be pulled along for a long distance.

Embodiment 7 (See FIGS. 19 and 20)

Gripping means for gripping the green case and used for the manufacturing apparatus of the present invention is shown here.

In the drawings, a part of the bracket 33 for fitting the gripping means v-2 of the carriage means v-1 is shown by the one-point chain lines. The gripping means v-2 is formed of a disk 50 having a leg part to be fitted to the above mentioned bracket 33, a boss 52 rotatably mounting a crank or arm pivoted in the central part of the disk 50, a plurality of tire gripping pawls 55 in each of which tracks 53 of so-called linear motion bearings provided in the above mentioned disk 50 are fixed and nuts 54 moving on the above mentioned tracks 53 are provided, a plurality of links 56 each connected at one end to the above mentioned arm 51 and at the other end to the gripping pawl 55, a double pivotal link 57 connected at one end to the above mentioned disk 50 and at the other end to the above mentioned arm 51 and a cylinder 58 mounted at one end on the connecting part of the above mentioned link 57 and at the other end on the above mentioned disk 50.

As illustrated, the above mentioned respective gripping pawls 55 are divided and box-shaped so as to enclose the green case GC from the outside thereof and have meniscus shoes 59 and a plurality of rollers 60 rotatably mounted on the above mentioned shoes 59. The rollers 60 are to grip the reinforced shoulder parts of the gripped green case and to be able to follow any unexpected rotation around the drum f axis of the green case GC in case the drum f within the green case is collapsed while the green case is gripped outside. The rollers, however, can be omitted. Therefore, according to the above mentioned structure, when the cylinder 58 is extended, the double link 56 will operate as shown by the one-point chain lines and will rotate the arm 51, as a result, the respective gripping pawls 55 connected through respective links 56 will be pulled radially inwardly to grip the green case GC from outside. Through (not illustrated), the opening limit and closing limit are to be regulated by stoppers.

Embodiment 8 (See FIGS. 21 and 22)

Improvements in the gripping means gripping the green case and used for the manufacturing apparatus of the present invention are shown here.

In the drawings, a part of the bracket 120 for fitting the gripping means of the above mentioned elevating and running means G-2 is shown by the one-point chain lines.

The gripping means G-3 is formed of a pillar 150 having a leg part to be secured to the above mentioned brackt 120, arms 151 provided in proper places of the pillar 150, bosses 152 provided in the arms 151, rods 153 and 154 slidably held in the vertical direction in the bosses 152, an arm 155 secured to the lower ends of the rods 153 and 154, a cylinder 156 connected at one end to the above mentioned arm 155 and at the other end to a proper place of the pillar 150, arcuate segments 157 and 158 secured to the above mentioned arm 155, arcuate segments 160 to 163 pivotally mounted at the respective ends of the arcuate segments 157 and 158 through pins 159, bars 164 and 165 connecting respectively the lower parts and upper parts of the arcuate segments 160, 162 and 161, 162, tie-rods 166 and 167 each connected at one end to the above mentioned upper bar 165 and at the other end to a proper place of the pillar 150 and rollers 168 rotatably mounted between the respective arcuate segments 157, 158 and 160 to 163.

The expanding limit and contracting limit of the above mentioned respective arcuate segments are to be sensed respectively by limit switches (not illustrated) arranged in proper places of the pillar 150. When the cylinder 156 is extended and contracted and the arm 155 is guided by the rods 153 and 154 to move up and down, the segments 157 and 158 will move up and down, thereby the segments 160 to 163 connected each at one end to the tie-rods 166 and 167 will pivot to be expanded and contracted between the solid line position and two-point chain line position as shown in FIG. 22.

The operation shall be explained in the following.

Before the green case GC is completed on the green case forming drum f, the green case transfer v will be contacted with the stopper 104 and will wait in a fixed position. At this time, the gripping means G-3 will be at the raised limit. When the green case GC is completed and it is sensed that there is nothing to obstruct the fall of the gripping means G-3, the motor 122 will be driven, the wire rope 128 wound up on the winding drum 126 will be payed out and the gripping means will be vertically lowered and will be kept horizontal. The locus of the gripping center at this time shall be $Y_1$—$Y_1$ in FIG. 11. When the gripping means G-3 lowers and the gripping center axis X'—X' is made coaxial with the axis X—X of the drum f, the lowering operation will stop.

This stopping is made by the stopper 134 and limit switch (not illustrated).

When the lowering limit is reached and it is sensed that the respective segments of the gripping means G-3 are at the expansion limit, the motor 106 will be driven, the wire rope 112 will be pullled and the carriage frame 111 and gripping means G-3 will move from the position $Y_1$—$Y_1$ to the position $Y_2$—$Y_2$ and will stop. This stop will be made when the motor 106 is stopped by the stopping order of the movable stopper and limit switch (not illustrated).

After stopping in the fixed position, the respective arcuate segments of the gripping means will be contracted in diameter by the operation of the cylinder 156 and will grip the green case GC from outside. When the limit switch for sensing the contraction limit operates, the drum f will be collapsed. When the collapse of the drum f is completed, the green case transfer G will be again return to the position $Y_1$—$Y_1$ and will stop and the gripping means G-3 will rise vertically upwardly.

When the gripping means G-3 rises to be in a position not obstructing the movement of the transfer v, on the drum f, the carcass band for the next tire will be fed and the assembling of the green case will be started. The green case transfer G at the rising limit will be moved as it is to the second stage forming means side and will stop and wait in the position $Y_2$—$Y_2$.

When the green tire is completed on the raw tire forming drum r and is taken out of the drum r and it is sensed that there is nothing to obstruct the lowering of the gripping means G-3, the gripping means G-3 will begin to lower and will stop so that the axis $X'—X'$ will become coaxial with the axis $X—X$. After the gripping means G-3 stops, the axis $Y_3—Y_3$ of the gripped green case GC will be moved to the position $Y_4—Y_4$ and will stop. At this time, the outside diameter of the drum e will be much smaller than the inside diameter of the bead part of the green case GC.

In the above mentioned stopping position, the bead part of the outside gripped green case GC will be gripped by the bead gripping means of the drum r.

Then, the respective arcuate segments of the gripping means G-3 will be again returned to the position $Y_3—Y_3$, it will rise and will stop in the upper limit position and then the green case transfer v will be transferred to a position above the position $Y_1—Y_1$ and will be made to wait until the next green case is completed.

As described above, as the green case GC assembled on the drum f is taken out of the drum f and can be mechanically and automatically transferrred from the drum f position to the drum r position, (i) the labor force will be much less than in the conventional method, (ii) the green case will be neither stained nor deformed when it is touched by hand or is mounted on a carriage, thus tires of a high quality can be produced, and (iii) as the formed green cases are treated in turn, problems of control of the size distinguishing chart and the limited day control in the intermediate storage position as in the conventional method will be solved.

Further, as the space above the equipment is utilized for transfer and waiting, no special floor space will be required. When the green case is to be taken out and fed, the griping means will move vertically upwardly. Therefore, the length of each equipment can be made a required minimum. As the gripping means is made to rise and fall only in two fixed positions, the power source can be fed only in the above mentioned two positions but can be cut during the running so that the means can run safely. Therefore, the power lines need not be pulled along during the running and the means can be made simple.

Further, as the gripping means according to this embodiment is so formed that the segments 157 and 158 are moved up and down by the cylinder 156 and, operatively connected with them, the segments 160, 161, 162 and 163 will expand and contract, the green case can be positively centered and gripped and the formation can be made simple, light and cheap.

Now, the use of the radial tire manufacturing apparatus of the present invention shall be explained. In this equipment, it is meant that, when tires are continuously produced, a plurality of tires will be simultaneously and parallelly produced on the equipment. For example, when the nth tire is being taken out of the tire discharging means u and transfer p, the transfer v will be gripping the (n+1)th green case GC and waiting in the waiting position I', the belt-tread structure BT to be used for the (n+1)th tire will be assembled on the belt-tread forming drum m, the (n+2)th green case GC will be assembled on the drum f and the (n+3)th carcass band CB will be assembled on the drum a. Thus, tires are continuously produced in turn on the respective means.

In explaining the operation, only the nth tire shall be taken up among all the parallel operations and how it is formed shall be explained.

(1) Assembling the carcass band CB:

The carcass band forming drum a is expanded so as to be of a predetermined peripheral length, the inner liner, carcass ply and other reinforcing members are delivered onto the drum a from the material feeding means c and are wound up, cut and connected by a predetermined procedure to laminate and form a cylindrical carcass band CB. The respective material winding beginning positions are displaced by a predetermined amount so that the joint positions may be dispersed in the peripheral direction. The above mentioned materials are preferably automatically wound up, cut, connected and displaced in the positions by the predetermined amount.

Then the respective materials are positively bonded with one another by the stitching means k to complete the nth carcass band CB. This stitching operation is also made automatically.

The transfer d having fed the (n−1)th carcass band to the drum f before the carcass band CB is completed is waiting for the completion of the nth carcass band CB in the waiting position B.

(2) Receiving and taking out the carcass band CB:

After the nth carcass band CB is completed, the transfer d with the expansible segments expanded is transferred to the drum a side and is stopped in the stopping position A. Then the above mentioned segments are contracted and the carcass band CB on the drum a is gripped from outside. After the gripping is completed, the drum a is contracted in the diameter and the carcass band CB on the drum a is delivered to the segments of the transfer d. The above mentioned transfer and stop of the transfer d, contraction of the segments and contraction of the drum a are made automatically.

After the carcass band forming drum a is contracted, the transfer d is transferred to be in the waiting position B. After the end of the carcass band CB on the transfer d passes the end of the drum a, at a proper time, the drum a is expanded and the (n+1)th carcass band is begun to be formed by the same procedure as in the above mentioned step (1).

(3) Transferring the carcass band CB and inserting it into the green case forming drum f:

The above mentioned drum f is collapsed, its outside diameter is made smaller than the inside diameter of the carcass band CB, the tailstock means i is in the retreated position, it is confirmed that the transfer v is not in the positions C and H and then the transfer d in the waiting position B is transferred and is stopped in the position C. After the transfer d stops, the drum f expands inside the carcass band CB to form a cylinder, then the segments of the transfer d expand to release the gripping of the carcass band CB and the carcass band CB is transferred from the transfer d to the drum f.

Then, the transfer d is again returned to the position B and waits until the (n+1)th carcass band CB is completed. The above mentioned transfer and stop of the transfer d, expansion of the drum f and expansion of the segments are automatically made.

The bead cores BC to be set respectively on the headstock g side and tailstock i side are set by the operator at a proper time before the carcass band CB is inserted If a method of automatically feeding the bead cores by the transfer d is adopted for setting the bead cores on the headstock g side, the work of the operator will be simplified by one half.

(4) Assembling the green case GC:

After the transfer d is returned to the position not obstructing the advance of the tailstock i, the tailstock i is advanced, is arranged coaxially with the drum f and is stopped. The overhanging parts of the carcass band CB on the drum f are transformed inwardly by a known method and the bead cores BC on both sides are set and are then enclosed with the above mentioned overhanging parts. Then such required materials as the side walls and rim cushions are delivered from the material feeding means i by a predetermined procedure and are wound up, cut and connected to the band.

The winding beginning positions of the respective materials are displaced by a predetermined amount so that the joint positions may be dispersed in the peripheral direction.

The above mentioned winding, cutting and connection of the materials and positon displacement by the predetermined amount are preferably automatically made.

Then the respective materials are positively bonded with one another by the stitching means l to complete the nth green case GC and the stitching means l and tailstock means i are in the retreated positions. This stitching operation and retreat are automatically made.

The transfer v having fed the (n−1)th green case to the drum r before the nth green case GC is completed, is waiting in the waiting position H' for the completion of the nth green case.

(5) Receiving, taking out and transferring the green case GC:

After the green case GC is completed, the arm 32 of the transfer v lowers and the gripping means v-2 suspended from the arm 32 is in the position H. Then the carriage means v-1 of the transfer v moves to the drum f side and is stopped by the stopper 42. At this time, the lower gripping means v-2 is in the position C.

After stopping, the gripping pawls 55 of the gripping means v-2 contract from outside and grip the nth green case GC on the drum f. After the gripping is completed, the drum f is collapsed and its outside diameter is made smaller than the inside diameter of the bead part of the green case GC.

The transfer v is again returned to the position H and is stopped. Then the above mentioned arm 32 rises, the gripping means v-2 and green case GC suspended from the arm 32 are made to be in the upper position H', then run to the position I', are stopped and are made to wait until the green case is required on the drum r.

After the gripping means part of the transfer v is elevated to the position not obstructing the movement of the transfer d, the transfer d in the waiting position B while holding the (n+1)th carcass band delivers the carcass band by the same procedure as in the above mentioned (3) and then the formation of the (n+1)th green case is continued.

The above mentioned respective operations of the transfer v, transfer d and drum f are made automatically.

(6) Inserting the green case GC into the drum r:

When the transfer p and tire discharging means u do not obstruct the fall of the gripping means v-2 of the transfer v and the drum r requires the green case GC, the transfer v waiting in the above mentioned position I' while gripping the nth green case GC will lower the arm 32 and will place the green case GC in the position I.

Then, when the carriage means v-1 moves to the drum r side and is stopped by the stopper, the green case GC gripped by the lower gripping means v-2 will be placed in the position G.

After stopping, the bead inside gripping means of the drum r expands inside the bead part of the green case GC and holds the green case GC, then the gripping pawls 55 of the gripping means v-2 are expanded and the nth green case GC is delivered to the drum r.

After the green case is delivered, the transfer v with the gripping pawls of the gripping means v-2 expanded is placed in the position I, then the above mentioned arm 32 is elevated and the gripping means v-2 is placed in the position I', is further moved to the position H and is made to wait until the (n+1)th green case is completed.

The above mentioned operations of the transfer v and drum r are automatically carried out.

(7) Expanding the green case GC and combining the belt-tread structure BT.

After the nth green case GC is supported inside by the bead inside gripping means of the drum r and the above mentioned transfer v is placed in the position I, compressed air is fed into the green case GC, the distance between both beads is reduced and the green case GC is transformed from the cylindrical form to a toroidal form. On the other hand, meanwhile, the transfer p outside grips the nth belt-tread structure formed on the drum m and is placed in the position G.

The above mentioned toroidal green case GC is further expanded and is contacted with the inside surface of the belt-tread structure BT held in the position G. After the contact, the above mentioned transfer p releases the outside gripping, delivers the belt-tread structure BT to the toroidal green case GC, is then placed in the position E and is made to wait.

After the transfer p moves to the position not obstructing the operation of the stitching means t, the stitching means t positively presses and bonds the above mentioned belt-tread structure BT and green case GC with each other. The above mentioned respective operations of the transfer p, drum r and stitching means t are automatically made.

(8) Assembling the belt-tread structure BT:

The belt-tread structure forming drum m is expanded to be of a predetermined peripheral length and the belt material, tread and others are delivered onto the drum m from the material feeding means o and are wound up, cut and connected by a predetermined procedure to laminate the nth annular belt-tread structure BT.

The winding beginning positions of the respective materials are displaced by a predetermined amount so as to disperse the joints in the peripheral direction.

The above mentioned winding up, cutting, connection and position displacement by a predetermined amount of the materials are preferably automatically made.

Then, if necessary, the belt and tread are positively pressed and bonded with each other by the stitching means (not illustrated) to complete the nth belt-tread structure BT.

The transfer p having delivered the (n−1)th tire to the tire discharging means u before this belt-tread structure BT is completed is waiting in the waiting position E for the completion of the nth belt-tread structure BT.

(9) Receiving and delivering the belt-tread structure BT:

After the nth belt-tread structure BT is completed, the transfer p with the segments expanded moves from the position E to the position F and stops. Then, the above mentioned segments contract in the diameter and grip the completed nth belt-tread structure BT from outside, the above mentioned drum m is collapsed to be of an outside diameter smaller than the inside diameter of the belt-tread structure BT.

Then the transfer p moves again to the position E and is made to wait until the operation time of the above mentioned (6). After the nth belt-tread structure BT passes the end of the drum m, at a proper time, the drum m is again expanded and begins to form the (n+1)th belt-tread structure BT.

(10) Taking out the raw tire GT:

After the stitching operation of the nth raw tire GT by the procedure of the above mentioned step (7) is completed, the transfer p in the waiting position E expands its segments so as to be of an inside diameter larger than the outside diameter of the completed nth raw tire Gt and stops.

After stopping, the above mentioned segments are contracted in diameter and outside grip the completed raw tire GT, the pressure air within the raw tire GT is removed and the bead inside gripping means gripping the bead part of the raw tire from inside is contracted in diameter so as to be of an outside diameter smaller than the inside diameter of the bead part of the raw tire. Meanwhile, the tire discharging means u is brought to the tire receiving position on the axial extension of the above mentioned drum r from the tire discharging position. The segments provided on the discharging means u are contracted so as to be of an outside diameter smaller than the inside diameter of the bead part of the raw tire and wait.

Then the transfer p outside grips the nth raw tire, takes the tire in the axial direction out of the drum r, is placed in the position F and stops. At this time, the above described segments of the discharging means u are in the inside position of the bead part of the raw tire GT.

Then the above mentioned segments of the discharging means u expand and inside grip the bead part of the raw tire GT outside gripped by the transfer p, further the segments of the transfer p expand, release the gripping of the raw tire and are again placed in the position G and thereby the nth raw tire GT is delivered to the tire discharging means u.

The tire discharging means u takes out the received raw tire GT in the direction at right angles with the axis of the drum r and the raw tire GT on the discharging means u is inspected as predetermined by the inspector and is sent to a curing step.

While the transfer p and tire discharging means u are taking out the nth completed tire GT, the (n+1)th green case GC completed on the drum f is transferred by the transfer v and is waiting in the position I' for the delivering time.

The above mentioned respective operations of the transfer p and tire discharging means u are automatically made.

From the above explanation, a series of operations beginning with assembling the carcass band up to taking out the completed raw tire by the tire discharging means u and the operations of the respective machine elements carried out in parallel with them will be understood. According to the above mentioned embodiments, a radial tire manufacturing apparatus which is high in productivity for satisfying the conventional requirements, can manufacture tires of a high quality, is economical and is high in the handlability, can be provided.

I claim:

1. A radial tire manufacturing apparatus, comprising:

first stage forming means for forming a green case having a cylindrical carcass band with tire sidewall forming members connected to the carcass band;

second stage forming means for converting the green case into a raw tire having a toroidal inside shape and a belt-tread structure; and green case transfer means for transferring the green case from said first stage forming means to said second stage forming means;

said first stage forming means comprising, a carcass band forming drum (a) for forming a cylindrical carcass band and having a central axis lying on a common axis (X—X), a green case forming drum (f) for receiving the carcass band, bead members for being enclosed on both ends of the carcass and sidewall forming members to be connected to the carcass band to form a green case, said green case forming drum having a central axis lying on said common axis and being spaced along said common axis from said carcass band forming drum, and band transfer means (d) movable between said carcass band forming drum and said green case forming drum to transfer the carcass band from said carcass band forming drum to said green case forming drum;

said second stage forming means comprising a belt-tread structure forming drum (m) for forming an annular belt-tread structure, said belt-tread structure forming drum having a central axis lying on said common axis and being spaced from said green case forming drum, a raw tire forming drum (r) having a central axis lying on said common axis and spaced from said belt-tread structure forming drum, said raw tire forming drum provided for receiving a green case from said green case forming drum and operable to expand the green case with the belt-tread structure there around into a toroidal shape for pressing and bonding the belt-tread structure to the green case to form a raw tire, and belt-tread transfer means (p) movable between said belt-tread structure forming drum and said raw tire forming drum to transfer the belt-tread structure from said belt-tread structure forming drum to said raw tire forming drum and to take a completed raw tire with toroidal shape and belt-tread structure pressed and bonded thereon out of said raw tire forming drum;

said green case transfer means (v) being movable parallel to said common axis from a position above said green case forming drum for being lowered to engage a green case and lifted to raise the green case at the position above said green case forming drum, to a position above said raw tire forming drum to lower the green case to the raw tire forming drum for attaching the green tire to the raw tire forming drum, said green case transfer means in its raised position being out of a pass of movement of said belt-tread transfer means.

2. A radial tire manufacturing apparatus according to claim 1, wherein said belt-tread structure forming drum comprises a rotary shaft, a drum base secured on said rotary shaft, a plurality of segments fitted to said drum base and being expansible in a radial direction and forming a substantially cylindrical rigid drum, a plurality of springs engaged with and biasing said segments in a contracting radial direction, fluid pressure inflating means for expanding said segments and means of transmitting movement of said inflating means to said segments.

3. A radial tire manufacturing apparatus according to claim 1, wherein said green case transfer means comprises running means disposed above said first stage forming means and second stage forming means so as to be reciprocatable parallel to said common axis, elevating means connected to said running means and vertically elevating and lowering the green case while keeping the green case in a fixed horizontal orientation, a lowered position for the green case being for receiving the green case from said first stage forming means and for delivering the green case to said second stage forming means, and expansible gripping means disposed on said elevating means and for gripping the green case from outside the green case.

4. A radial tire manufacturing apparatus according to claim 3, wherein said gripping means comprises a plurality of gripping pawls expansible in a radial direction and a mount for carrying said pawls.

5. A radial tire manufacturing apparatus according to claim 4, wherein said gripping means for gripping the outside of a green case comprises three gripping pawls, one of the gripping pawls being movable vertically up and down and the other two gripping pawls being pivotably mounted so as to expand and contract radially and operatively connected with said vertical movement of said vertically movable gripping pawl on both sides thereof.

6. A radial tire manufacturing apparatus according to claim 5, wherein said belt-tread structure forming drum comprises a rotary shaft, a drum base secured on said rotary shaft, a plurality of segments fitted to said drum base and being expansible in a radial direction and forming a substantially cylindrical rigid drum, a plurality of springs engaged with and biasing said segments in a contracting radial direction, a fluid pressure inflating means for expanding said segments and means of transmitting movement of said inflating means to said segments.

7. A radial tire manufacturing apparatus according to claim 3, wherein said belt-tread structure forming drum comprises a rotary shaft, a drum base secured on said rotary shaft, a plurality of segments fitted to said drum base and being expansible in a radial direction, and forming a substantially cylindrical rigid drum, a plurality of springs engaged with and biasing said segments in a contracting radial direction, a fluid pressure inflating means for expanding said segments and means of transmitting movement of said inflating means to said segments.

8. A radial tire manufacturing apparatus according to claim 7, wherein said inflating means comprises a tire structure having a periphery engaging against each of said segments and flexible sidewalls connected to said periphery, and a rim connected to each of said flexible sidewalls for closing an inflatable space defined by said rim, said flexible sidewalls and said periphery.

9. A radial tire manufacturing apparatus according to claim 7, wherein said elevating means includes a bracket connected to said gripping means and a parallelogram connected between said bracket and said running means for holding said bracket horizontal with vertical elevating and lowering of a green case by said elevating means.

10. A radial tire manufacturing apparatus according to claim 9 including drive means connected to said elevating means for elevating and lowering a green case, first power supply means connected to said running means at a position above said green case forming drum for supplying power to said drive means and second power supply means connected to said running means above said raw tire forming means for supplying power to said drive means, said drive means being without power between said first and second power supply means.

11. A radial tire manufacturing apparatus according to claim 10 wherein said gripping means comprises a pillar connected to said elevating means, a lower arcuate portion connected to said pillar for engagement under a green case, a pair of side arcuate portions pivotably mounted to either side of said lower arcuate portion for engaging sides of a green case and drive means for driving said side arcuate portions together on a part for holding and releasing a green case.

* * * * *